United States Patent
Yamauchi et al.

(10) Patent No.: US 7,583,846 B2
(45) Date of Patent: *Sep. 1, 2009

(54) TEXTURE IMAGE COMPRESSING DEVICE AND METHOD, TEXTURE IMAGE DECOMPRESSING DEVICE AND METHOD, DATA STRUCTURES AND STORAGE MEDIUM

(75) Inventors: Yasunobu Yamauchi, Kanagawa-ken (JP); Shingo Yanagawa, Kanagawa-ken (JP); Masahiro Sekine, Kanagawa-ken (JP); Takeshi Nagai, Saitama-ken (JP); Hideyuki Ueno, Kanagawa-ken (JP); Nakaba Kogure, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/078,586

(22) Filed: Apr. 2, 2008

(65) Prior Publication Data

US 2008/0232647 A1 Sep. 25, 2008

Related U.S. Application Data

(63) Continuation of application No. 10/765,122, filed on Jan. 28, 2004, now Pat. No. 7,372,990.

(30) Foreign Application Priority Data

Jan. 30, 2003 (JP) ............................ P2003-021423

(51) Int. Cl.
    *G06K 9/36* (2006.01)
(52) U.S. Cl. .................. 382/232; 382/166; 345/582
(58) Field of Classification Search .................. 382/166, 382/232; 345/582
    See application file for complete search history.

(56) References Cited

U.S. PATENT DOCUMENTS 5,659,631 A * 8/1997 Gormish et al. ............. 382/166

(Continued)

OTHER PUBLICATIONS

Chen et al., "Light Field Mapping: Efficient Representation and Hardware Rendering of Surface Light Fields," Proceedings of ACM SIGGRAPH 2002, pp. 447-456.

(Continued)

*Primary Examiner*—Charles Kim
*Assistant Examiner*—John W Lee
(74) *Attorney, Agent, or Firm*—Finnegan, Henderson, Farabow, Garrett & Dunner, L.L.P.

(57) ABSTRACT

A texture image compressing device includes a separating unit configured to separate intensity maps that include intensity values and light source-independent texture images, those images including color components from a plurality of texture images corresponding to a plurality of different light source directions and a plurality of different viewpoint directions. The device also includes an intensity map compressing unit configured to compress the intensity maps to generate compressed intensity maps and representative intensity maps that are codebooks of the compressed intensity maps, a light source-independent texture image compressing unit configured to compress the light source-independent texture images to generate light source-independent texture compressed images and color component conversion tables that are codebooks of the light source-independent texture compressed images, and a compressed texture generating unit configured to generate compressed textures by combining the compressed intensity maps, the representative intensity maps, the light source-independent texture compressed images and the color component conversion tables.

4 Claims, 19 Drawing Sheets

U.S. PATENT DOCUMENTS

| | | | |
|---|---|---|---|
| 6,097,394 A * | 8/2000 | Levoy et al. | 345/419 |
| 6,111,979 A * | 8/2000 | Katto | 382/154 |
| 6,297,834 B1 | 10/2001 | Malzbender | |
| 6,333,743 B1 * | 12/2001 | Gossett et al. | 345/503 |
| 2002/0126313 A1 * | 9/2002 | Namizuka | 358/2.1 |
| 2003/0072496 A1 * | 4/2003 | Woodell et al. | 382/260 |
| 2004/0041816 A1 | 3/2004 | Yamauchi et al. | |
| 2004/0212625 A1 | 10/2004 | Sekine et al. | |

OTHER PUBLICATIONS

Dana et al., "Reflectance and Texture of Real-World Surfaces," IEEE Computer Society Conference on Computer Vision and pattern Recognition (1997), pp. 151-157.

Levoy et al., "Light Field Rendering," Proceedings of ACM SIGGRAPH 1996, pp. 31-42.

Gortler et al., "The Lumigraph," Proceedings ACM SIGGRAPH 1996, pp. 43-54.

* cited by examiner

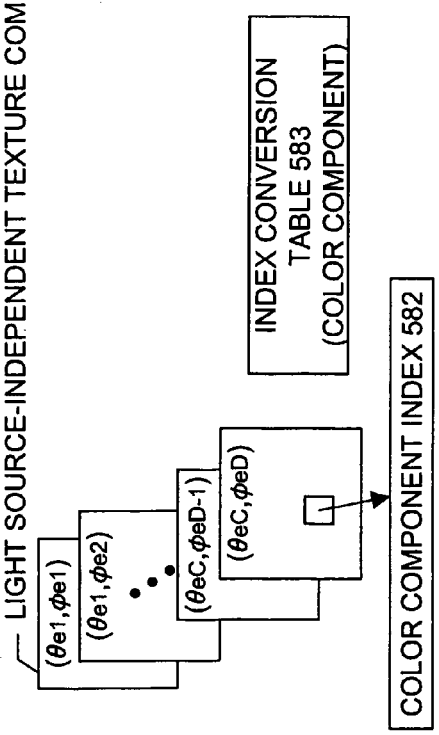
FIG. 9A
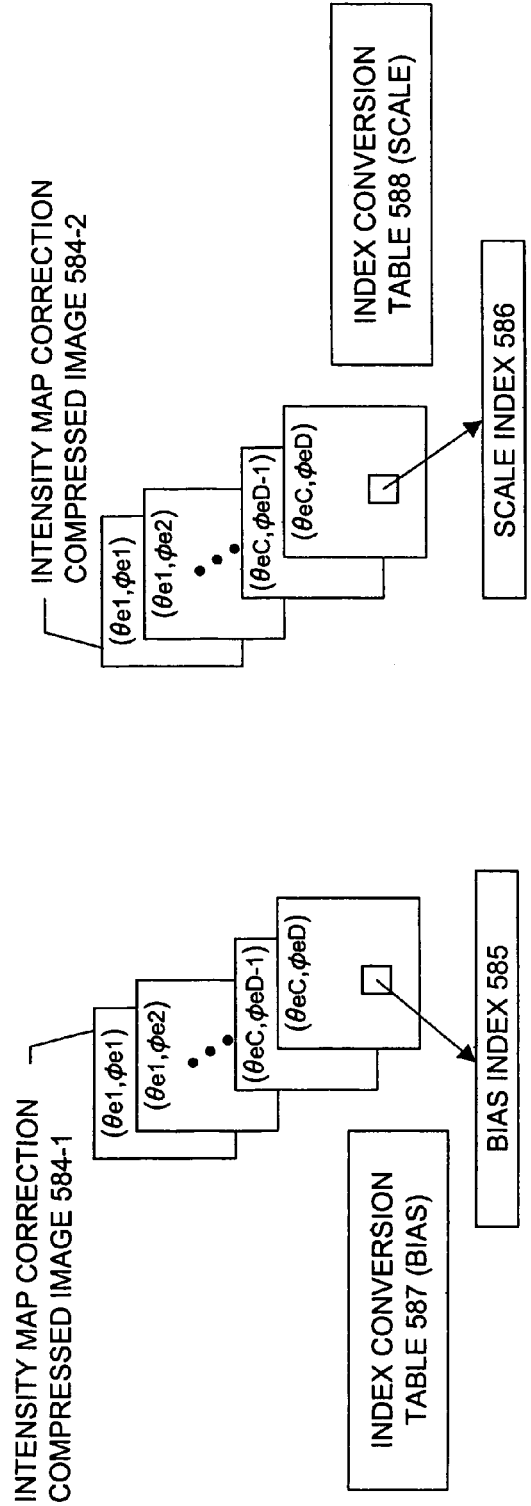
FIG. 9B
FIG. 9C

TEXTURE IMAGE COMPRESSING DEVICE AND METHOD, TEXTURE IMAGE DECOMPRESSING DEVICE AND METHOD, DATA STRUCTURES AND STORAGE MEDIUM

CROSS-REFERENCE TO RELATED APPLICATION

This is a continuation of application Ser. No. 10/765,122, filed Jan. 28, 2004, which is incorporated herein by reference.

This application is based upon and claims the benefit of priority from prior Japanese Patent Application No. P2002-21423 filed on Jan. 30, 2003, the entire contents of which are incorporated herein by reference.

BACKGROUND

1. Field of the Invention

The present invention relates to a texture compressing device and method. The device and method are for compressing texture image data. Texture images are used in realizing optical characteristics of an object surface that change in accordance with viewpoint directions and light source directions in texture mapping.

The present invention also relates to a texture decompressing device and method used in decompressing original texture images from texture image data compressed by the aforementioned texture compressing device or method.

The present invention also relates to data structures of texture images compressed by the aforementioned texture compressing device or method.

The present invention also relates to a storage medium in which is stored data of the aforementioned data structure.

2. Description of the Related Art

The appearance of a three-dimensional (3D) object depends on the following three factors: the shape of the object, the color of its surface, and the texture of its surface. These factors change with the direction of the viewpoint (viewpoint direction) and the direction of the light source (light source direction)

In the field of 3D computer graphics, a 3D object is drawn in the following manner. First, the surface of the 3D object is divided into a plurality of polygons. Then, each polygon is drawn as a two-dimensional image. When the viewpoint direction or the light source direction changes, the orientation of each polygon (three-dimensional position) and the optical characteristics of the polygons (e.g., intensity) are changed.

The orientation of the polygons is defined by normals of the polygons. In order to calculate the relation between the normals of the polygons and the viewpoint direction or the light source direction, vector calculation of floating point accuracy has been necessary. It has been difficult to make such a vector calculation, because a very-high-performance processor and very complex software have been needed.

Thus, a plurality of methods for changing the orientation and optical characteristics of the polygons by using simple calculations have been proposed. Texture mapping is one of these methods. Texture mapping is a method that pastes (maps), on a polygon surface, a polygonal image (texture image) whose pattern and design are drawn. This method is possible to express detailed portions of the polygon interior, such as its pattern.

Texture mapping has been improved in order to enable higher quality drawing. For example, there are a method of defining the texture image coordinates based on the vertices of the polygons in order to control the orientation of the texture image, and a method that uses a photograph for the texture image. However, there is a problem even with these improved texture mapping methods. Because a single texture image is pasted regardless of the 3D position of the polygon, the methods cannot express the optical characteristics of the object surface that change in accordance with the viewpoint direction and the light source direction.

Several improved methods for expressing the optical characteristics of an object surface have been proposed.

(1) "Bump Mapping" is a method that minutely changes the orientation of the normal of an object surface to determine changes in optical characteristics. This method uses 3D vector calculations, such as calculation of the normal. Thus, this method has the problem that there are many calculations required.

(2) In Dana, et. al, "Reflectance and Texture of Real World Surfaces", ACM Transaction on Graphics, 18(1): 1-34, 1999, a method called. BTF (Bi-directional Texture Function) has been proposed. BTF is a method that expresses texture components of a polygon surface in accordance with the viewpoint direction and the light source direction.

Each of the viewpoint direction and the light source direction can be represented by two variables. However, there has been no example of BTF in which sampling of an image has been conducted while changing all four variables representing the viewpoint direction and the light source direction. A case has been proposed where a subset, in which two or three variables are changed, has been handled. Such a case is described, for example, in Chen, et. al, "Light Field Mapping Efficient Representation and Hardware Rendering of Surface Light Fields", Proceedings SIGGRAPH 2002, pp. 447-456.

(3) A method called PTM (Polynomial Texture Mapping) has been disclosed in U.S. Pat. No. 6,297,834. PTM is a method that approximates, with a function, intensity changes dependent on the light source direction and the viewpoint direction. In this method, the light source direction is expressed in two dimensions. The intensity of each pixel is approximated with a secondary function of the two variables representing the light source direction. Each texture retains six coefficients of this secondary function as parameters for expressing the intensity changes. By using these parameters, a change in the light source direction can be expressed.

Most graphics devices of recent years have a pixel shader. A pixel shader is a function for conducting shading by using a programmed calculation unit on the hardware. A pixel shader accelerates calculations such as PTM.

When intensity changes are mapped in consideration of a change of the viewpoint direction, it is necessary to generate a higher order function than in the case of only the light source direction. The number of coefficients of the function will increase and the amount of time for function approximation will be large. Thus, it is difficult to generate textures in consideration of both the viewpoint direction and the light source direction, when using PTM.

(4) Image base rendering has been proposed in Light Field Rendering (Levoy et. al, "Light Field Rendering", Proceedings SIGGRAPH 1996, pp. 31-42) and Lumigraph (Gortler, et. al, "The Lumigraph", Proceedings SIGGRAPH 1996, pp. 43-54). In this method, an image seen from a certain viewpoint direction is generated by interpolation using a plurality of viewpoint direction images that have been prepared in advance.

In this method, in order to raise image quality and the flexibility of the viewpoint direction, it is necessary to increase the number of viewpoint directions of the images prepared in advance. There is a tendency for the data amount of the images prepared in advance to become enormous. In order to compress the data, compression-rate-fixed vector quantization or predictive coding using an image of a similar viewpoint direction is used. Vector quantization has been proposed in, for example, U.S. Pat. No. 6,097,394.

However, in the image-base rendering methods proposed up to this point, the changes dependent on the light source direction have not been considered.

As mentioned above, in the methods proposed up to this point, it is necessary to prepare a large-volume of texture images where the viewpoint directions and the light source directions are different, and the methods have problems such as there being many calculations. Thus, a method that expresses, with textures, the optical characteristics of an object surface that change in accordance with the viewpoint direction and the light source direction has not been provided as a practical system.

SUMMARY OF THE INVENTION

Embodiments consistent with the present invention may provide a texture image compressing device that can compress a plurality of texture images corresponding to a plurality of different light source directions and a plurality of different viewpoint directions.

According to an aspect of the present invention, there is provided a texture image compressing device comprising a separating unit configured to separate intensity maps including intensity values and light source-independent texture images including color components from a plurality of texture images corresponding to a plurality of different light source directions and a plurality of different viewpoint directions, an intensity map compressing unit configured to compress the intensity maps to generate compressed intensity maps and representative intensity maps that are codebooks of the compressed intensity maps, a light source-independent texture image compressing unit configured to compress the light source-independent texture images to generate light source-independent texture compressed images and color component conversion tables that are codebooks of the light source-independent texture compressed images, and a compressed texture generating unit configured to generate compressed textures by combining the compressed intensity maps, the representative intensity maps, the light source-independent texture compressed images and the color component conversion tables.

Embodiments consistent with the invention may also provide a texture image decompressing device that can decompress texture images corresponding to desired viewpoint directions and desired light source directions from compressed textures in which are compressed a plurality of texture images corresponding to respective plural different light source directions and a plurality of different viewpoint directions.

According to another aspect of the present invention, there is provided a texture image decompressing device comprising a compressed texture input device inputting a compressed texture into which a plurality of texture images corresponding to respective a plurality of different light source directions and a plurality of different viewpoint directions have been compressed, a light source/viewpoint direction input device inputting a viewpoint direction and a light source direction of a decompression target texture image, a conversion table extracting unit configured to extract, from the compressed texture, representative intensity maps and color component conversion tables, a data extracting unit configured to extract, from the compressed texture, compressed intensity maps corresponding to the inputted viewpoint direction and light source-independent texture compressed images corresponding to the inputted viewpoint direction, a light source-independent texture image extracting unit configured to extract light source-independent texture images from the light source-independent texture compressed images by using the color component conversion tables, an intensity component computing unit configured to compute intensity components of the decompression target texture image by using the representative intensity maps and the compressed intensity maps, and a texture image generating unit configured to generate the decompression target texture image by using the light source-independent texture images and the intensity components.

Additional features and advantages consistent with the invention will be set forth in part in the description which follows, and in part will be obvious from the description, or may be learned by practice of the invention. The features and advantages consistent with the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

BRIEF DESCRIPTION OF THE DRAWINGS

FIG. 9A shows an example of data structures of light source-independent texture compressed images, FIG. 9B shows an example of data structures of intensity map correction compressed images relating to bias components, and FIG. 9C shows an example of data structures of intensity map correction compressed images relating to scale components, with the light source-independent texture compressed images and the intensity map correction compressed images being obtained by vector-quantizing the light source-independent texture images and the intensity map correction images, and with each of these being disposed with a unique index conversion table;

DETAILED DESCRIPTION

Reference will now be made in detail to the embodiments consistent with the invention, examples of which are illustrated in the accompanying drawings. Wherever possible, the same reference numbers will be used throughout the drawings to refer to the same or like parts.

A texture image compressing device of a first embodiment consistent with the invention will be described below with reference to the drawings.

Texture mapping is a method used in the field of three-dimensional (3D) computer graphics that expresses an object by dividing the object surface into a plurality of polygons and pasting a texture image onto each polygon to generate a two-dimensional image.

The 3D object's appearance depends on the viewpoint direction and the light source direction. When either the viewpoint direction or the light source direction changes, the 3D object's appearance changes. A change in the viewpoint direction mainly influences the 3D position of the polygons, i.e., the 3D position of the texture images pasted on each polygon. A change in the light source direction mainly influences the optical characteristics of the polygons, i.e., the optical characteristics such as the intensity distribution of the texture images pasted on each polygon. Thus, changes in the 3D object's appearance are expressed by changing the 3D positions and optical characteristics of the texture image.

First, the 3D object is photographed with regard to combinations of a plurality of viewpoint directions and light source directions to acquire a plurality of texture images in advance. Then, the texture image corresponding to the viewpoint direction and the light source direction one wishes to express is pasted on a polygon. These texture images are referred to herein as "multi-viewpoint/multi-light source texture images". Also, the multi-viewpoint/multi-light source texture images may be not only images photographed with a camera but also images created by humans as in computer graphics.

However, the combinations of the viewpoint directions and the light source directions are infinite. For this reason, the amount of data to be prepared in advance is enormous. The texture image compressing device of the present embodiment is a device that is useful for compressing numerous texture images whose viewpoint directions and light source directions are different.

Figure 1:
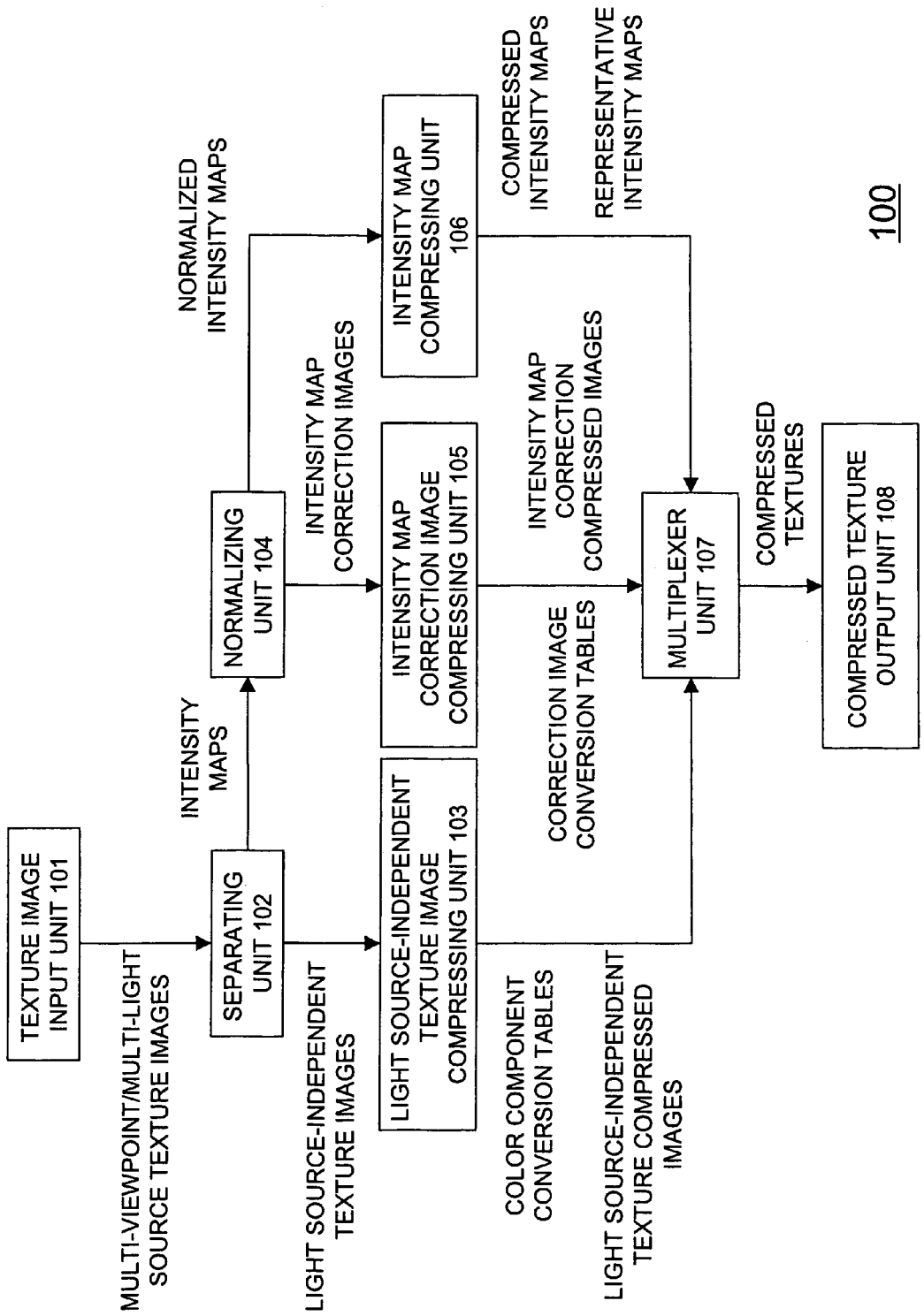
FIG. 1 shows a block diagram of a configuration of a texture compressing device of a first embodiment consistent with the present invention.

FIG. 1 is a block diagram of a texture image compressing device 100 of the present embodiment. First, the schematic configuration of the device will be described. The device includes a texture image input unit 101 for inputting multi-viewpoint/multi-light source texture images. A separating unit 102 separates the inputted multi-viewpoint/multi-light source texture images into intensity maps corresponding to intensity components and light source-independent texture images corresponding to color components.

The device 100 also includes a light source-independent texture image compressing unit 103. The light source-independent texture compressing unit 103 compresses the light source-independent texture images and generates light source-independent texture compressed images and color component conversion tables. The color component conversion tables are codebooks of the light source-independent texture compressed images. The compressing method in the light source-independent compressing unit 103 will be described later.

The device 100 also includes a normalizing unit 104 that normalizes the intensity maps and generates normalized intensity maps and intensity map correction images. The pixel value of each pixel of the intensity map correction images is a parameter used when the intensity maps are normalized.

The device 100 also includes an intensity map correction image compressing unit 105. The intensity map correction image compressing unit 105 compresses the intensity map correction images and generates intensity map correction compressed images and correction image conversion tables. The correction image conversion tables are codebooks of the intensity map correction compressed images. The compression processing in the intensity map correction image compressing unit 105 will be described later.

The device 100 also includes an intensity map compressing unit 106 that compresses the normalized intensity maps and generates compressed intensity maps and representative intensity maps. The representative intensity maps are codebooks of the compressed intensity maps. The compression processing in the intensity map compressing unit 106 will be described later.

The device 100 also includes a multiplexer unit 107 that generates compressed texture and a compressed texture output unit 108 that outputs the compressed texture. The multiplexer unit 107 multiplexes the light source-independent texture compressed images, the intensity map correction compressed images, the compressed intensity map images, the color component conversion tables, the correction image conversion tables and the representative intensity maps.

Each unit of the device 100 will be described below. The texture image input unit 101 accumulates inputted multi-viewpoint/multi-light source texture images. Each of the multi-viewpoint/multi-light source texture images is an image of an object obtained by photographing the object from a certain viewpoint direction at the time the object is irradiated with light from a certain light source direction. Each pixel of each multi-viewpoint/multi-light source texture image has data including an intensity value and a color component.

The separating unit 102 rearranges the data of the multi-viewpoint/multi-light source texture images to provide "rearranged texture images". The separating unit 102 separates the rearranged texture images into intensity maps corresponding to the intensity components and light source-independent texture images corresponding to the color components.

Each multi-viewpoint/multi-light source texture image has pixels whose viewpoint directions and light source directions are the same. The separating unit 102 rearranges each pixel of the multi-viewpoint/multi-light source texture images so that each rearranged texture image has pixels whose positions on the multi-viewpoint/multi-light source texture images are the same and whose viewpoint directions are the same. The number of rearranged texture images becomes equal to the product of the number of viewpoint directions and the number of pixels in a single multi-viewpoint/multi-light source texture image.

The separating unit 102 generates intensity maps from each of the rearranged texture images. The intensity maps are generated by separating the intensity component from each pixel. Each of the intensity maps is an image representing the change in the intensity value at a certain single point in a certain viewpoint direction/texture image in a case where the light source direction has been changed.

The separating unit 102 separates the color components from each of the rearranged texture images. The color of each pixel is represented by the color component and the intensity value of each pixel. The color component of each pixel is not dependent on the direction of the light source. The separating unit 102 compiles color components whose viewpoint directions are the same and generates light source-independent texture images. The number of light source-independent texture images becomes equal to the number of viewpoint directions.

The light source-independent texture image compressing unit 103 compresses the light source-independent texture images using vector quantization and generates light source-independent texture compressed images and color component conversion tables that are codebooks thereof.

The normalizing unit 104 normalizes the intensity values of the intensity maps. Due to the normalization, the ranges of the intensity values in all of the intensity maps become the same. The normalizing unit 104 also generates intensity map correction images and normalized intensity maps. The intensity map correction images and the normalized intensity maps are generated by grouping the conversion parameters at the time each intensity map is normalized. The intensity map correction images and the normalized intensity maps are images having conversion parameters as pixel values.

The intensity map correction image compressing unit 105 compresses the intensity map correction images by vector-quantizing and generates intensity map correction compressed images and correction image conversion tables that are codebooks thereof.

The intensity map compressing unit 106 compresses the normalized intensity maps by quantizing and generates compressed intensity maps and representative intensity maps that are codebooks thereof.

The multiplexer unit 107 combines the light-source independent texture compressed images, the intensity map correction compressed images and the compressed intensity maps, whose viewpoint directions are the same, to generate compressed texture blocks. The number of the compressed texture blocks is equal to the number of viewpoint directions. The multiplexer unit 107 also combines the representative intensity maps, the correction image conversion tables, the color component conversion tables and the compressed texture blocks to generate compressed texture.

The compressed texture output unit 108 outputs the generated compressed texture.

Figure 2:
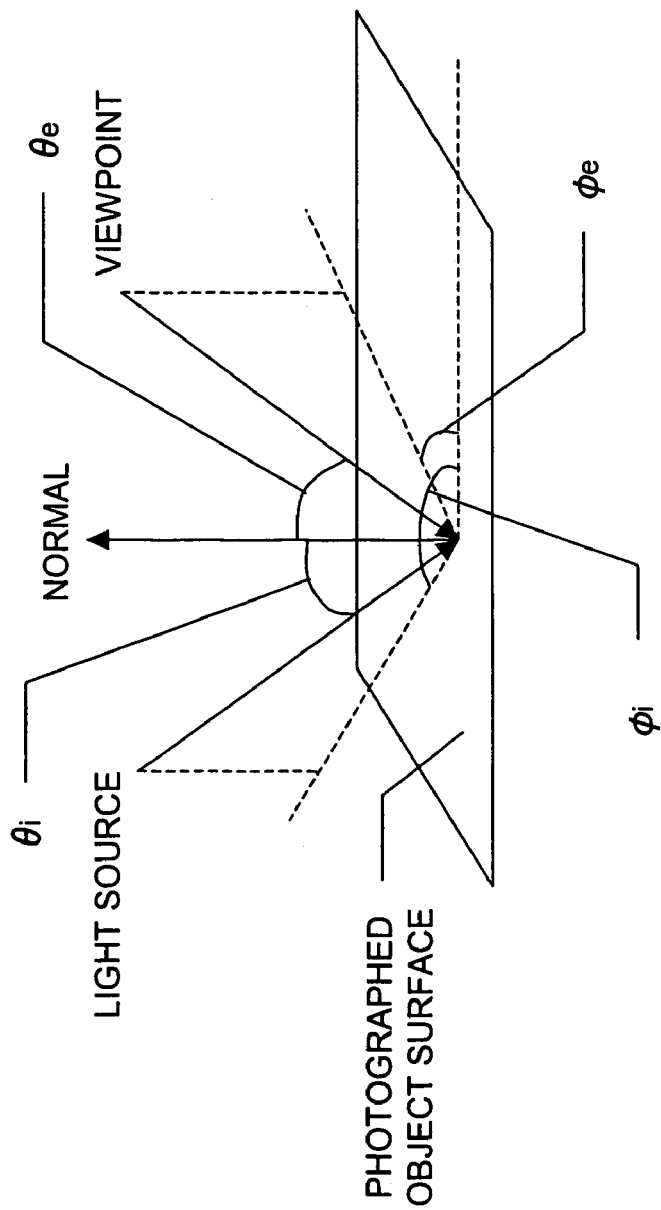
FIG. 2 shows a relation between a viewpoint direction, a light source direction and a normal relating to a surface of a photographed object.

FIG. 2 shows a viewpoint direction and a light source direction on the basis of an object surface normal. In FIG. 2, a normal vector of a photographed object is the base axis of the polar angle $\theta$ in a spherical coordinate system and the photographed object surface includes the base axis of the azimuth $\phi$. In this coordinate system, each of the multi-viewpoint/multi-light source texture images that have been prepared in advance as input data can be identified by the four parameters of the viewpoint direction $(\theta_e, \phi_e)$ and the light source direction $(\theta_i, \phi_i)$. Thus, the texture image compressing device of the present embodiment uses the parameters $\theta_e$, $\phi_e$, $\theta_i$, $\phi_i$ to identify the texture images, which are obtained by photographing the object surface from a certain viewpoint direction $(\theta_e, \theta_e)$, when the object surface is irradiated with light from the light source direction $(\theta_i, \phi_i)$.

The texture compressing device of the present embodiment is a computer program. That is, the texture compressing device of the present embodiment is realized by executing a texture compression program that causes the functions of the aforementioned units to be realized with a computer. It should be noted that part or all of the device may also be realized as hardware such as a semiconductor integrated circuit.

Figure 3:
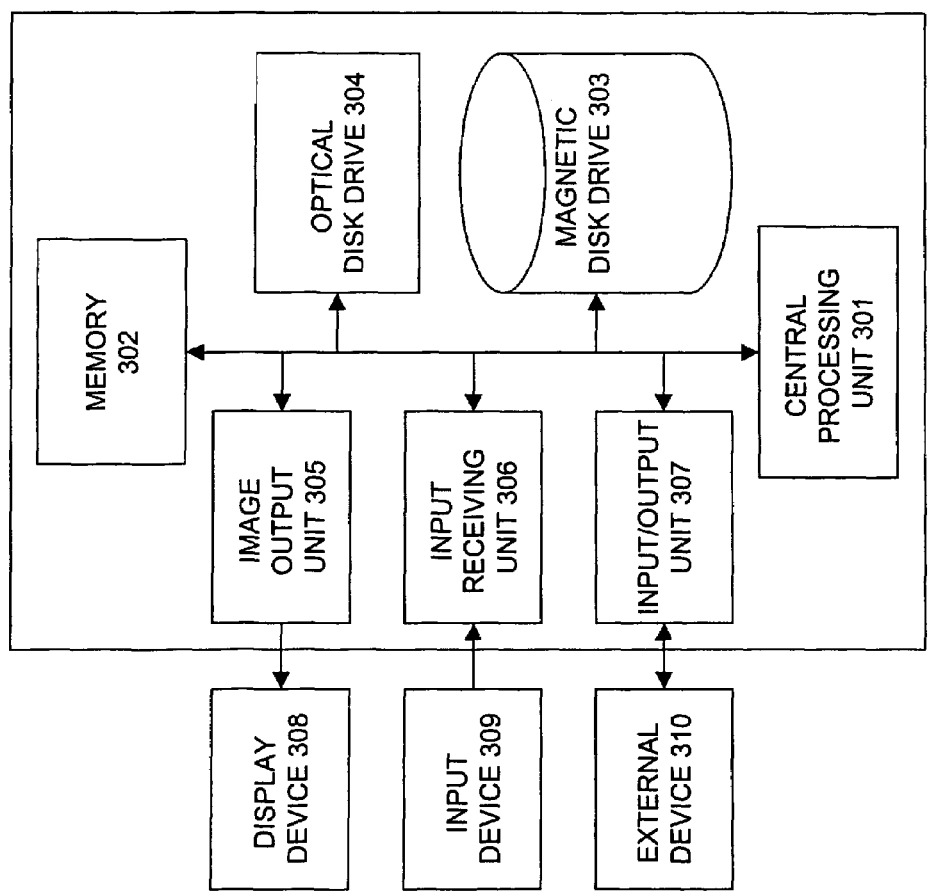
FIG. 3 shows a block diagram of a configuration of a computer.

FIG. 3 is a block diagram of a computer that executes the texture compression program of the present embodiment.

The computer has a central processing unit 301 and a memory 302 that temporarily stores the texture compression program and data being processed. The computer also has a magnetic disk drive 303 that stores the texture compression program, data before compression and data after compression, and an optical disk drive 304. The computer also has a display device 308 such as an LCD or a CRT, an image output unit 305 that is an interface for outputting an image signal to the display device 308, an input device 309 such as a keyboard or a mouse, and an input receiving unit 306 that is an interface for receiving an input signal from the input device 309. The computer also has an input/output unit 307 that is an interface (e.g., a USB, a network interface, etc.) connected to an external device 310.

The texture compression program of the present embodiment is stored in advance in the magnetic disk drive 303. The texture compression program is read from the magnetic disk drive 303 and stored for execution in the memory 302. The texture compression program is executed by the central processing unit 301. When the texture compression program is executed, compressed texture is generated from the texture images. The generated compressed texture is stored in the magnetic disk drive 303. It should be noted that the texture compression program may also output the compressed texture to another program using the function (shared memory, pipe, etc.) of inter-process communications (IPC). When the texture compression program is executed, a GUI presenting information during the course of texture compression processing and a GUI for receiving input from a user are displayed on the display device 308 via the image output unit 305. The texture compression program of the present embodiment operates in cooperation with the OS (Operating System) operating in the computer.

Figure 4:
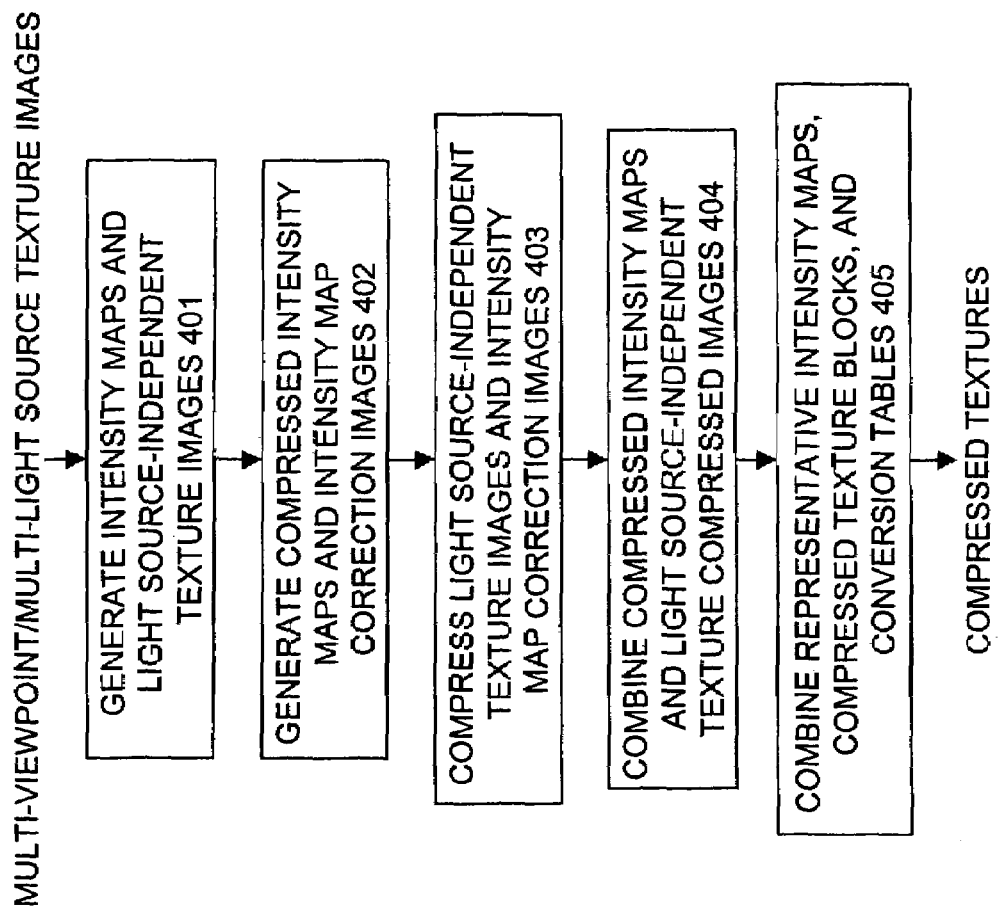
FIG. 4 shows a flow chart describing operation of the texture compressing device of the first embodiment.

FIG. 4 shows the flow of processing of the texture compressing device of the present embodiment.

(Step 401)

The separating unit 102 generates the intensity maps and the light source-independent texture images. The separating unit 102 separates the pixels of each multi-viewpoint/multi-light source texture image into the intensity components, which are dependent on the light source direction and changes, and the color components, which are not dependent on the light source direction. The separating unit 102 generates the intensity maps, in which aspects of intensity changes corresponding to changes in the light source direction per pixel are expressed as images, from the intensity components and generates the light source-independent texture images from the color components. Detailed processing in this step will be described later. Here, the general flow of processing will be described.

Figures 5A, 5B:
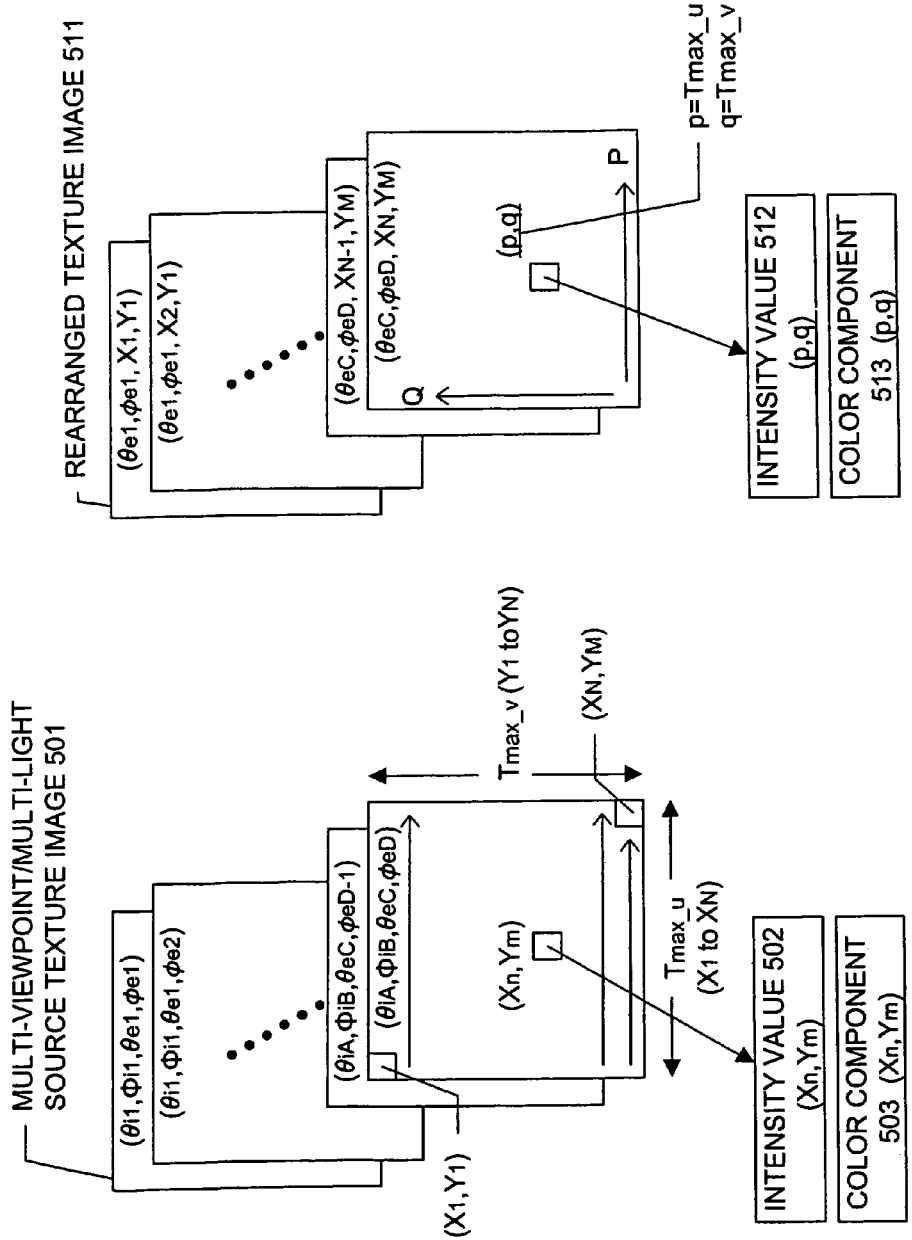
FIG. 5A shows an example of data structures of multi-viewpoint/multi-light source texture images and FIG. 5B shows an example of data structures of rearranged texture images obtained by rearranging the multi-viewpoint/multi-light source texture images.

First, the separating unit 102 compiles and rearranges the data of the multi-viewpoint/multi-light source texture images per viewpoint direction. FIG. 5A shows data structures of multi-viewpoint/multi-light source texture images 501. FIG. 5B shows data structures of rearranged texture images 511 obtained by rearranging.

Each of the multi-viewpoint/multi-light source texture images 501 is an image in which the number of vertical pixels is $T_{max\_v}$ and the number of horizontal pixels is $T_{max\_u}$. Each pixel $(X_n, Y_m)$ of each of the multi-viewpoint/multi-light source texture images 501 includes an intensity value 502 and a color component 503.

The separating unit 102 identifies the multi-viewpoint/multi-light source texture images 501, which are obtained by photographing an object from the viewpoint direction $(\theta_e, \phi_e)$, with the identifier $(\theta_e, \phi_e, \theta_i, \phi_i)$ in the case of the light source direction $(\theta_i, \phi_i)$. That is, each of the multi-viewpoint/multi-light source texture images 501 corresponds to "1 viewpoint direction·1 light source direction".

The separating unit 102 rearranges the pixels of the multi-viewpoint/multi-light source texture images 501 so that one image corresponds to "1 viewpoint, 1 point on the multi-viewpoint/multi-light source texture image 501". The separating unit 102 groups pixels whose viewpoint directions and whose coordinates on the multi-viewpoint/multi-light source texture images 501 are the same to generate each of the rearranged texture images 511.

Each pixel of each of the multi-viewpoint/multi-light source texture images 501 is identified by the viewpoint direction $(\theta_e, \phi_e)$, the light source direction $(\theta_i, \phi_i)$ and coordinates $(X_n, Y_m)$ on the multi-viewpoint/multi-light source texture images 501 to which the pixels belong. Each of the rearranged texture images 511 is identified by the viewpoint direction $(\theta_e, \phi_e)$ and the coordinates $(X_n, Y_m)$ on the multi-viewpoint/multi-light source texture images 501. The light source direction $(\theta_i, \phi_i)$ of each pixel in each of the rearranged texture images 511 is different.

The separating unit 102 determines the coordinates (p, q) of each pixel of the rearranged texture images 511 on the basis of the light source direction $(\theta_i, \phi_i)$. Specifically, these are represented by the following equations.

$$p = T_{max\_u} \times (\sin \theta_i) \times (\cos \phi_i) \qquad (1)$$

$$q = T_{max\_v} \times (\sin \theta_i) \times (\cos \phi_i) \qquad (2)$$

Each pixel of the rearranged texture images 511 includes, as information, an intensity value 512 and a color component 513. As will be understood from equations (1) and (2), both p and q are not limited to integers. However, because the rearranged texture images 511 are images, the coordinates of each pixel become integer values. Thus, the separating unit 102 determines the intensity value 512 and the color component 513 of each pixel of the rearranged texture images 511 with a method such as interpolation.

Figures 6A, 6B:
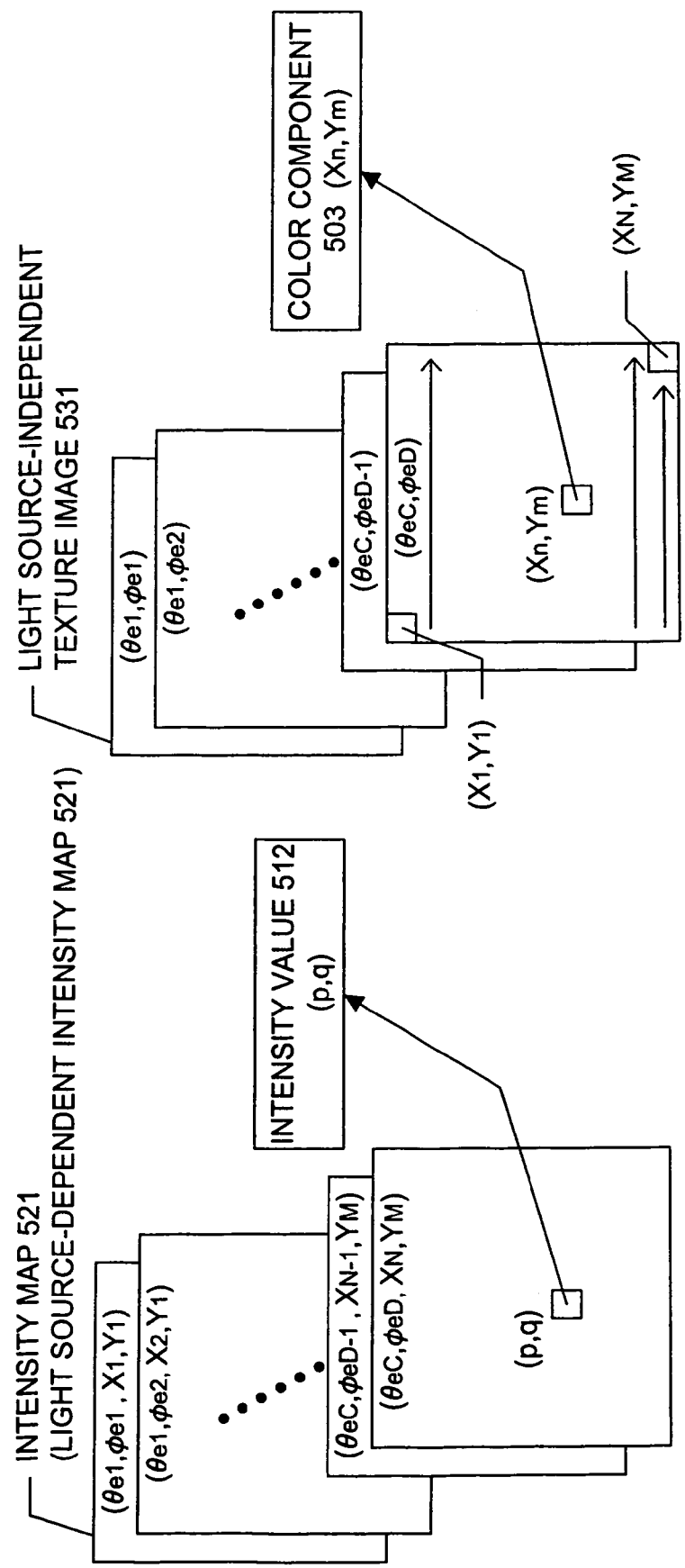
FIG. 6A shows an example of data structures of intensity maps and FIG. 6B shows an example of data structures of light source-independent texture images, with the intensity maps and the light source-independent texture images being obtained by separating them from the rearranged texture images.

Next, the separating unit 102 separates the rearranged texture images 511 into intensity maps 521 and light source-independent texture images 531. The intensity maps 521 include the intensity values 512. The light source-independent texture images 531 include the color components 503, which are not dependent on the light source direction. FIG. 6A shows data structures of the intensity maps 521. FIG. 6B shows data structures of the light source-independent texture images 531.

The separating unit 102 separates each pixel of each of the rearranged texture images 511 into the intensity value components and the color components. The separating unit 102 then generates images having intensity values as pixel values and generates images having color components as pixel values.

The images having intensity values as pixel values are the intensity maps 521. The intensity maps 521 are generated from the intensity values 512 of each pixel of the rearranged texture images 511.

The light source-independent texture images 531 are generated from the color components. Usually, the color of each pixel on the texture images is reproduced as the product of the color component and the intensity value. The color components are determined on the basis of pixel information at the time the intensity values are the greatest among various light source directions. That is, with respect to each rearranged texture image 511, the color component of the point having the highest intensity value serves as the pixel value of each pixel of the light source-independent texture images 531. As a result, one light source-independent texture image 531 is generated in regard to one viewpoint direction, and each of the light source-independent texture images is identified by the viewpoint direction $(\theta_e, \phi_e)$.

The separating unit 102 searches for the pixel whose intensity value 512 is the greatest from among the rearranged texture images 511 identified by the coordinates $(X_n, Y_m)$ and the viewpoint direction $(\theta_e, \phi_e)$. The separating unit 102 then adopts, as the color component of the pixel in the coordinates $(X_n, Y_m)$ of the light source-independent texture images identified by the viewpoint direction $(\theta_e, \phi_e)$, the color component 513 of the pixel having the greatest intensity value.

(Step 402)

Using the normalizing unit 104 and the intensity map compressing unit 106, intensity map correction images 551 (FIG. 7B) and compressed intensity maps 571 (FIG. 8B) are generated from the intensity maps 521.

The range of the intensity values of the intensity maps 521 (maximum value, minimum value, contrast) varies for each intensity map. The normalizing unit 104 normalizes the intensity maps 521 and makes uniform the range of the intensity values in all of the intensity maps. Due to the intensity maps 521 being normalized, the intensity maps 521 can be compressed at a higher compression rate than in a case where they are not normalized. The normalizing unit 104 determines intensity map correction images representing correction parameters for reproducing the original range per each intensity map.

Figure 7B:
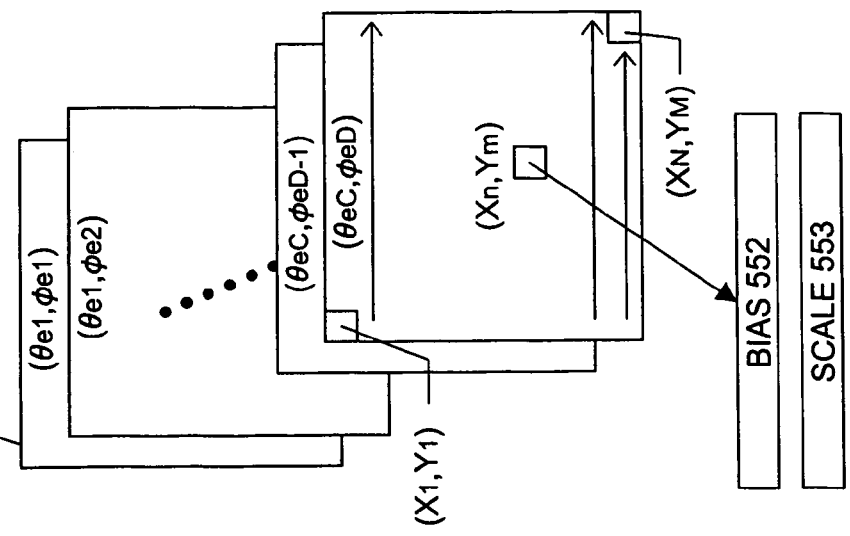
FIG. 7A shows an example of data structures of normalized intensity maps and FIG. 7B shows an example of data structures of intensity map correction images, with the normalized intensity maps and the intensity map correction images being obtained by normalizing the intensity maps.
Figure 7A:
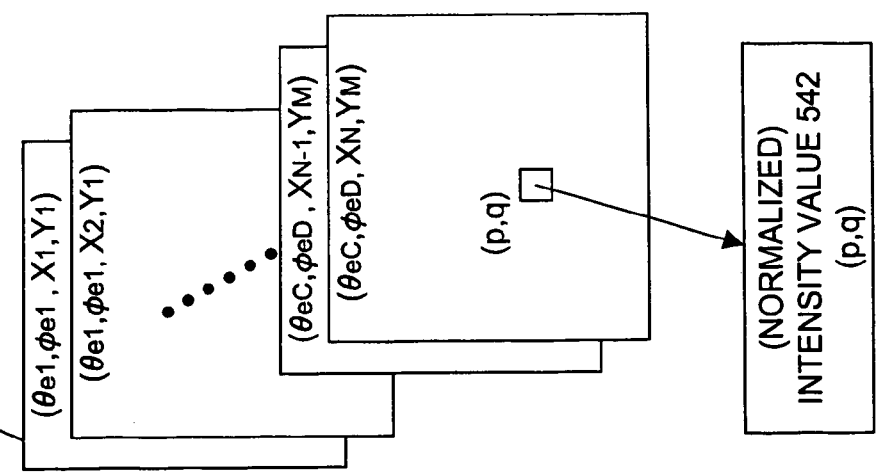

FIG. 7A shows data structures of normalized intensity maps 541 obtained by normalizing the intensity maps 521. FIG. 7B shows data structures of the intensity map correction images 551 obtained by normalizing the intensity maps 521.

Each pixel of the intensity map correction images 551 has a bias 552 and a scale 553 as pixel values. The biases 552 and the scales 553 are parameters determined at the time the intensity maps 521 are normalized. The normalizing unit 104 generates biases 552 and scales 553 of the same number as the intensity maps 521. The intensity maps 521 are identified by the viewpoint direction $(\theta_e, \phi_e)$ and the coordinates $(X_n, Y_m)$ on the multi-viewpoint/multi-light source texture images. Thus, the biases 552 and the scales 553 are identified by the viewpoint direction $(\theta_e, \phi_e)$ and the coordinates $(X_n, Y_m)$ on the multi-viewpoint/multi-light source texture images.

The normalizing unit 104 groups the biases 552 and the scales 553 per viewpoint direction, arranges them according to the order of the coordinates $(X_n, Y_m)$ on the texture images, and generates the intensity map correction images 551. Intensity map correction images 551 of the same number as the viewpoint directions are generated.

In the present embodiment, the normalizing unit 104 normalizes by adjusting the intensity value of each pixel of the intensity maps 521. In the present embodiment, the normalizing unit 104 normalizes the intensity value of each pixel of the intensity maps 521 by 1 byte (256 levels from 0 to 255). The normalizing unit 104 converts the maximum value of all the intensity values to 255 and converts the minimum value of all the intensity value to 0. When the intensity value of a certain pixel prior to normalization is represented as $I_{orig}$, the maximum and minimum values of the intensity value prior to normalization are represented as $I_{orig\_max}$ and $I_{orig\_min}$, and the intensity value after normalization is represented as $I_{norm}$, conversion represented by the following equation is conducted.

$$I_{norm}=255\times(I_{orig}-I_{orig\_min})/(I_{orig\_max}-I_{orig\_min}) \quad (3)$$

At the time of the aforementioned conversion, the normalizing unit 104 determines the minimum value (or maximum value or median value) of the intensity value prior to normalizing and the difference between the maximum value and the minimum value of the intensity value. The difference and the minimum value are used for obtaining the intensity maps from the normalized intensity maps. In the present embodiment, the minimum intensity value of each intensity map 521 is the bias 552, and the range of each intensity map 521 is the scale 553. These are the pixel information on each pixel of the intensity map correction images 551.

It should be noted that the normalizing unit 104 may also normalize by modifying the pixel distribution patterns of the intensity maps 521. In this method, the normalizing unit 104 processes where the pixel distribution pattern of each intensity map 521 approaches a normal distribution pattern (distribution pattern with an average of 0 and dispersion of 1). The biases 552 and the scales 553 are defined as parameters for returning the average and the dispersion of the pixel values of the intensity maps 521 to the original patterns from the normal distribution patterns.

Figure 8B:
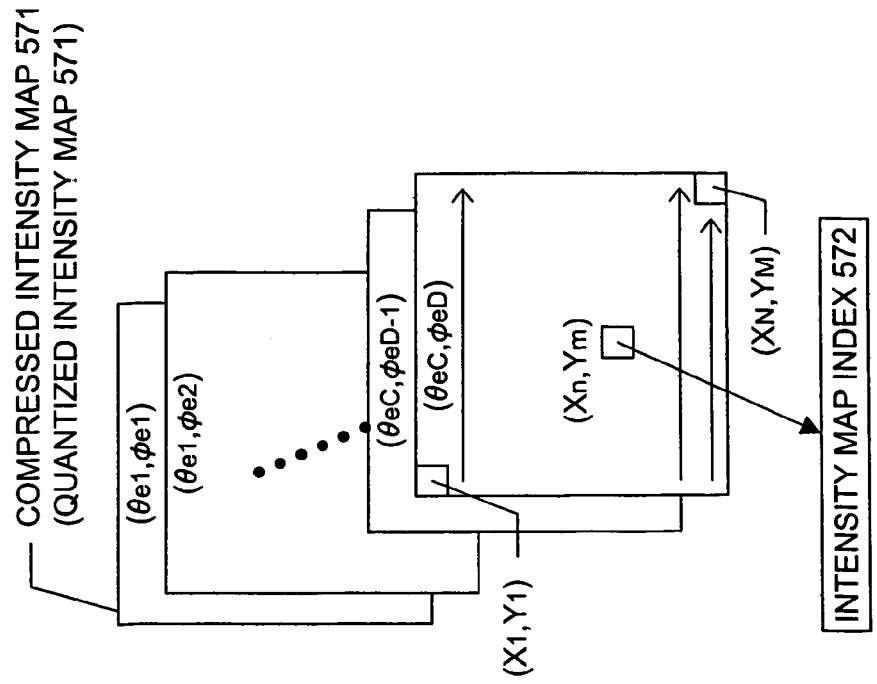
FIG. 8A shows an example of data structures of representative intensity maps and FIG. 8B shows an example of data structures of compressed intensity maps, with the representative intensity maps and the compressed intensity maps being obtained by quantizing the normalized intensity maps.

The intensity map compressing unit 106 compresses the normalized intensity maps 541 by quantization. The intensity map compressing unit 106 generates representative intensity maps 561 (FIG. 8A) and compressed intensity maps 571 (FIG. 8B). The representative intensity maps 561 include indices 562 (FIG. 8A), which are quantization codebooks.

Figure 8A:
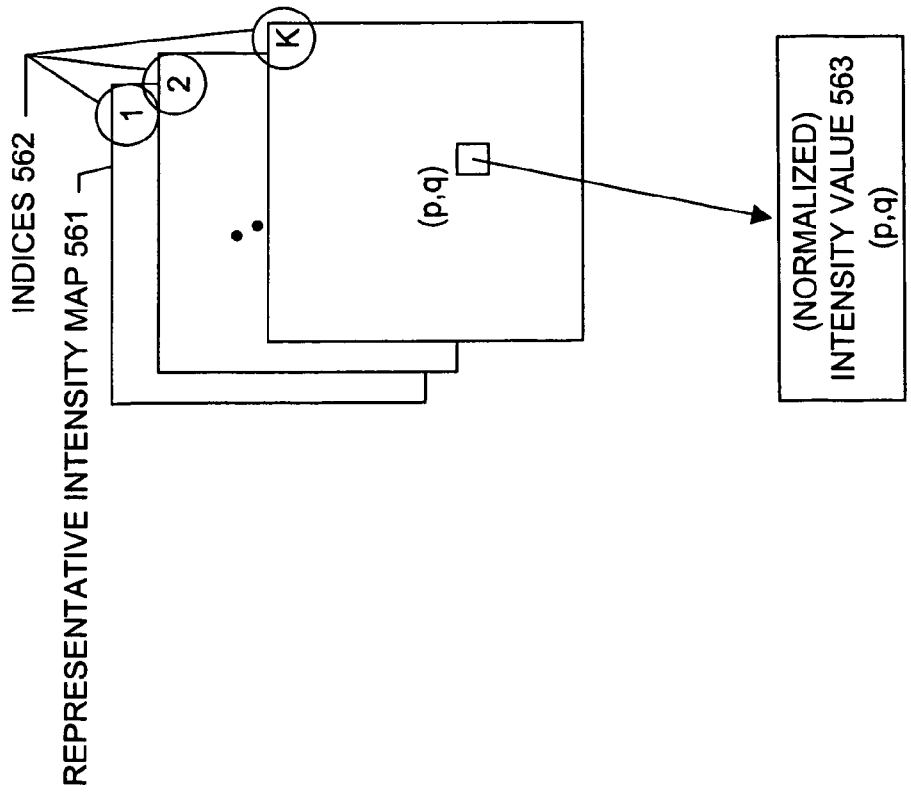

FIG. 8A shows data structures of the representative intensity maps 561. FIG. 8B shows data structures of the compressed intensity maps 571. The intensity map compressing unit 106 compresses the normalized intensity maps 541 by quantization. The intensity map compressing unit 106 generates compressed intensity maps 571 and representative maps 561. The number of compressed intensity maps 571 is equal to the number of the normalized intensity maps 541. The number of representative maps 561 is not more than the number of the normalized intensity maps 541.

Each of the representative intensity maps 561 has an identifier called an index 562. In the present embodiment, numbers are given as the indices 562. It should be noted that other codes (e.g., variable-length codes) may also be allocated. The representative intensity maps 561 and the indices 562 fulfill the role of quantization codebooks. Each pixel value of the representative intensity maps 561 is a normalized intensity value.

As a result of quantization, each of the normalized intensity maps 541 is replaced by any of the indices 562 and becomes the pixel of the compressed intensity maps 571. Each pixel value of the compressed intensity maps 571 is one of the intensity map indices 572.

(Step 403)

The light source-independent texture image compressing unit 103 compresses the light source-independent texture images 531. The intensity map correction image compressing unit 105 compresses the intensity map correction images 551.

The intensity map correction image compressing unit 105 separates each of the intensity map correction images 551 into bias images having the biases 552 as pixel values and scale images having the scales 553 as pixel values. The intensity map correction image compressing unit 105 also respectively vector-quantizes the bias images and the scale images. The light source-independent texture image compressing unit 103 regards each of the light source-independent texture images 531 as images having the color components 503 as pixel values. The light source-independent texture image compressing unit 103 also vector-quantizes the light source-independent texture images 531.

FIG. 9A shows data structures of light source-independent texture compressed images 581. The light source-independent texture compressed images 581 are the compressed light source-independent texture images 531. FIG. 9B shows data structures of intensity map correction compressed images 584-1, which are the vector-quantized bias images. FIG. 9C shows data structures of intensity map correction compressed images 584-2, which are the vector-quantized scale images.

The light source-independent texture compressed images 581 have an index conversion table 583 for the color component. The intensity map correction compressed images 584-1 have an index conversion table 587 for the bias. The intensity map correction compressed images 584-2 have an index conversion table 588 for the scale. It should be noted that the index conversion tables 587 and 588 correspond to the aforementioned correction image conversion tables.

The detailed processing of quantization in this step will be described later.

It should be noted that, although the biases, scales and color components are separated and quantized in the present embodiment, part or all of these may also be grouped and quantized.

(Step 404)

The multiplexer unit 107 generates compressed texture blocks 591. The multiplexer unit 107 combines, per viewpoint direction, the compressed intensity maps 571, the light source-independent texture compressed images 581 and the intensity map correction compressed images 584-1 and 584-2.

In the present embodiment, in consideration of convenience at the time the original texture images are decompressed from the compressed texture blocks 591, the multiplexer unit 107 combines these in the order of the compressed intensity maps 571→the intensity map correction compressed images 584-1→the intensity map correction compressed images 584-2→the light source-independent texture compressed images 581. However, these may be combined in an order different from this.

Figure 10:
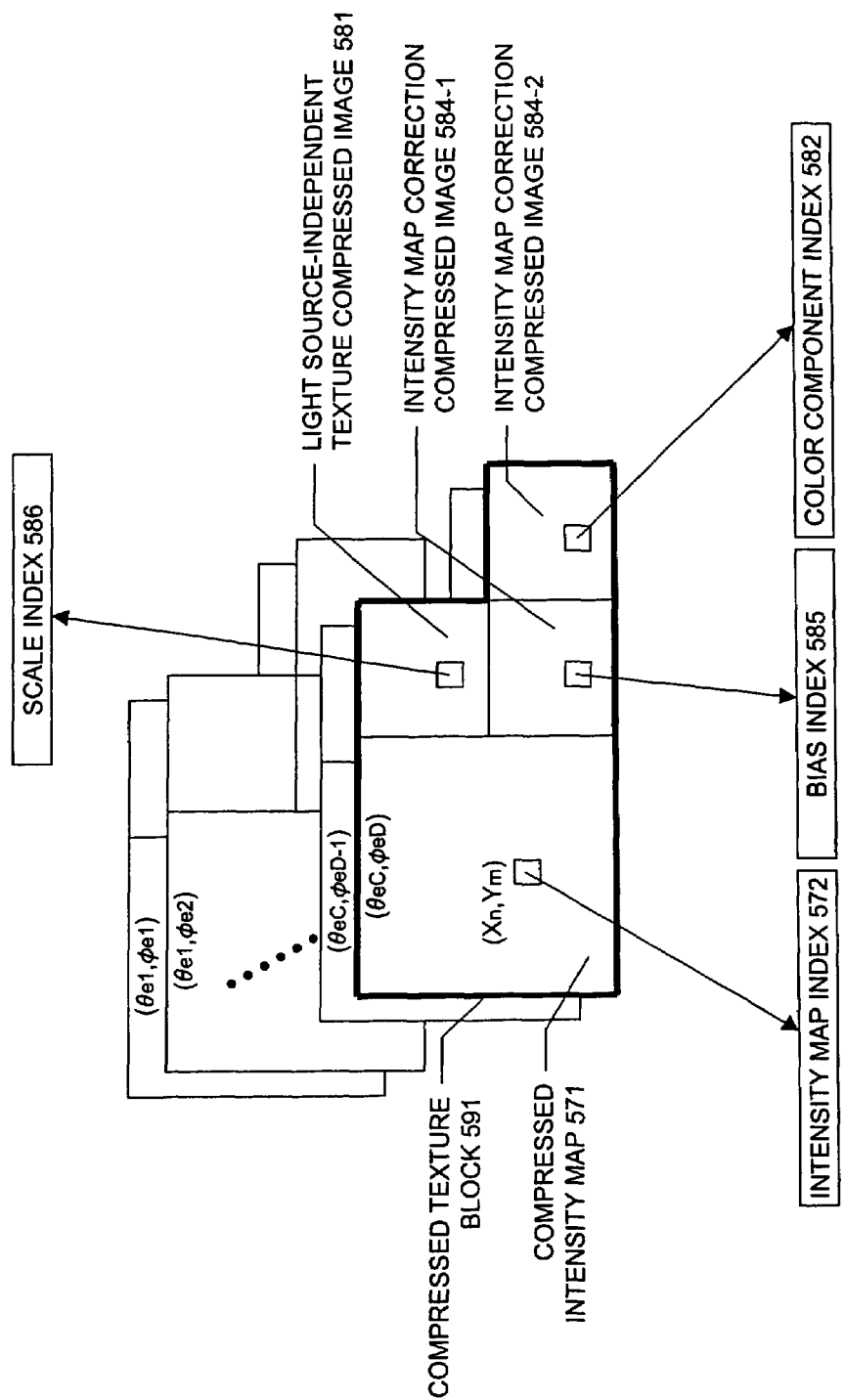
FIG. 10 shows an example of data structures of compressed texture blocks, with the compressed texture blocks being obtained by combining the compressed intensity maps, the light source-independent texture images and two kinds of intensity map correction images, except that the index conversion tables with which the light source-independent texture images and the two kinds of intensity map correction images are disposed are not combination targets.

FIG. 10 shows data structures of compressed texture blocks 591. Each of the compressed intensity maps 571 is generated per viewpoint direction. Each of the light source-independent texture compressed images 581 is also generated per viewpoint direction. Both intensity map correction compressed images 584-1 and 584-2 are generated per viewpoint direction. One compressed texture block 591 in which these are combined is generated per viewpoint direction.

(Step 405)

The multiplexer unit 107 generates compressed texture 1100 (FIG. 11) by combining the compressed texture blocks 591, the representative intensity maps 561, the index conversion tables 583 for the color components, the index conversion tables 587 for the biases 552 and the index conversion tables 588 for the scales 553.

Figure 11:
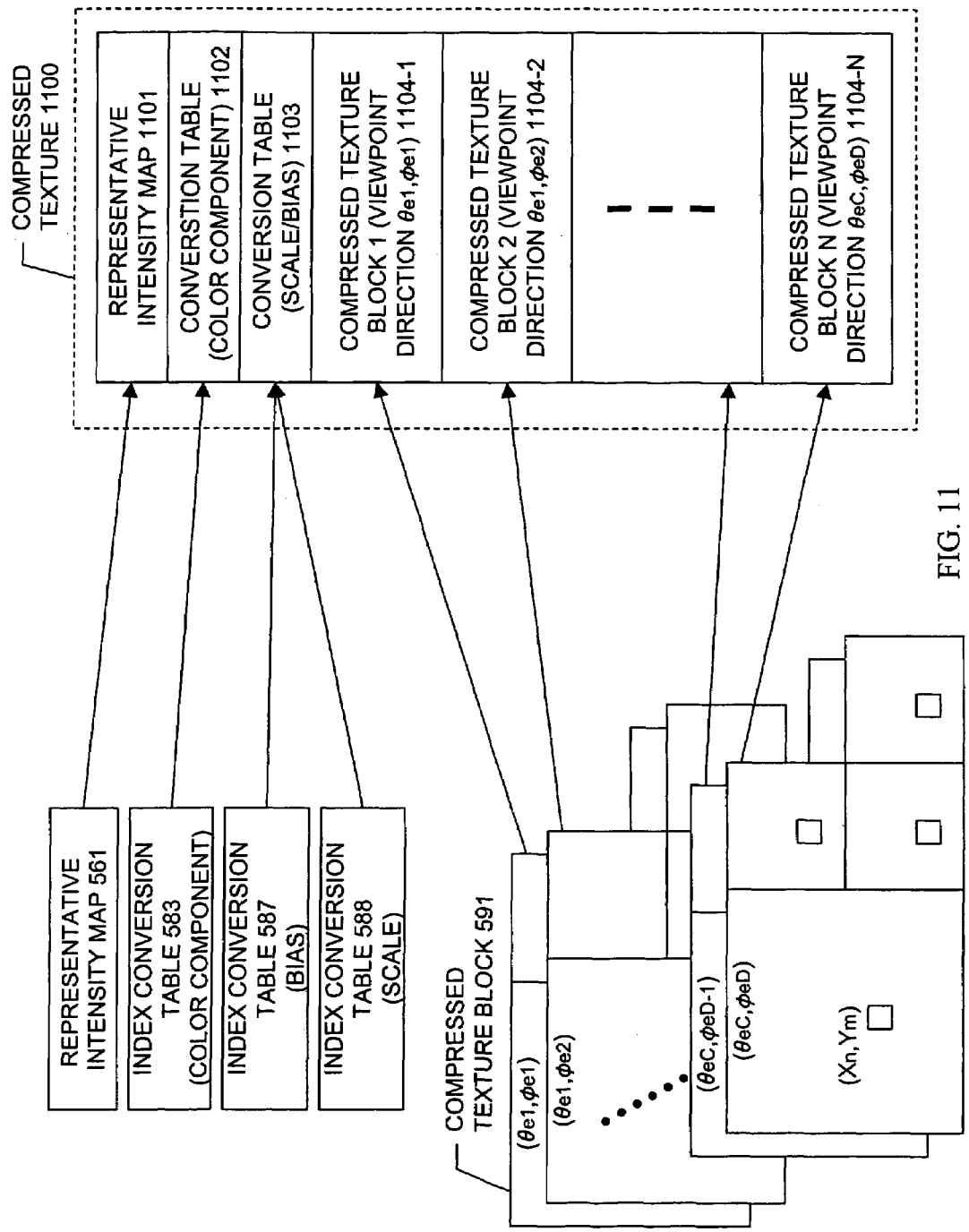
FIG. 11 shows an example of the data structure of a compressed texture.

FIG. 11 shows the data structure of the compressed texture 1100. The compressed texture 1100 includes a representative intensity map 1101, conversion tables 1102 and 1103, and compressed texture blocks 1104-1, 1104-2 to 1104-N. The representative intensity map 1101 is the representative intensity map 561 generated in step 402. The conversion table 1102 is the index conversion table 583 for the color component generated in step 403. The conversion table 1103 includes the index conversion table 587 for the scale and the index conversion table 588 for the bias generated in step 403. The compressed texture blocks 1104-1, 1104-2 to 1104-N are the compressed texture blocks 591 generated in step 404.

The aforementioned data structure of the compressed texture 1100 is convenient when the user decompresses a texture image relating to a desired viewpoint direction. The user can decompress the texture image using the representative intensity map 1101, the color component conversion table 1102, the conversion table 1103 relating to the scale and bias, and the compressed texture block 1104-$x$ ($x$=1, 2 ... N) relating to the desired viewpoint direction. Of the compressed texture blocks 1104-1, 1104-2 to 1104-N, only the compressed texture block 1104-$x$ relating to the aforementioned desired viewpoint direction is necessary.

In a case where processing is conducted with a computer, the computer can extract the texture images by at least the compressed texture block 1104-$x$ of all of the compressed texture blocks 1104-1, 1104-2 to 1104-N being read in the memory. Even a computer having only limited memory, i.e., not having enough memory for storing all of the compressed texture blocks 1104-1, 1104-2 to 1104-N can extract the texture images.

Each of the aforementioned steps will be described in detail below with reference to the drawings.

(Details of Step 401)

Figure 12:
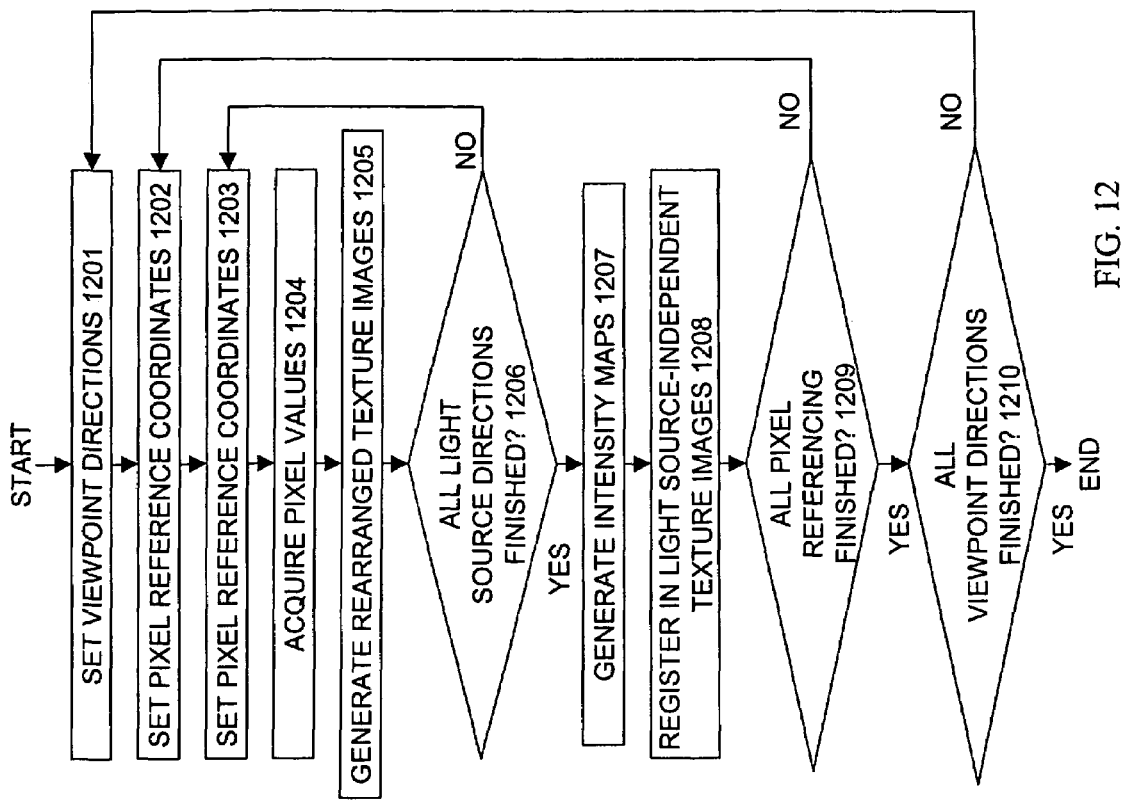
FIG. 12 shows a flow chart of processing that generates the intensity maps and the light source-independent texture images from the multi-viewpoint/multi-light source intensity maps.

FIG. 12 is a flow chart of the processing of step 401. In step 401, the intensity maps 521 and the light source-independent texture images 531 are generated from the multi-viewpoint/multi-light source texture images 501.

Step 1201 is the starting point of a loop that repeats the processing while changing the viewpoint direction of the texture image. The separating unit 102 sets the viewpoint direction $(\theta_e, \phi_e)$ of a texture image serving as the processing target out of the multi-viewpoint/multi-light source texture images 501. The separating unit 102 designates the viewpoint direction with a polar angle $\theta$ and an azimuth $\phi$. For example, in a case where multi-viewpoint/multi-light source texture images are photographed in increments of 10 degrees ($\theta$=0 to 90 degrees; $\phi$=0 to 350 degrees) in regard to the polar angle $\theta$ and the azimuth $\phi$, the separating unit 102 designates the viewpoint direction as (0, 0), (0, 10) ... (90, 0) while changing each component of the viewpoint direction $(\theta_e, \phi_e)$ in increments of 10 degrees.

Step 1202 is the starting point of a loop that repeats the processing while changing the coordinates of each pixel on the texture image. The separating unit 102 sets pixel reference coordinates for referencing each pixel on the texture image. The separating unit 102 also sets the coordinates $(X_n, Y_m)$ representing the processing target pixel.

The separating unit 102 references each pixel information on the texture image to generate the intensity maps. For this reason, the separating unit 102 sets the coordinate system for designating each pixel. In the coordinate system in the present embodiment, the horizontal axis of the texture image is the X axis and the vertical axis is the Y axis.

Step 1203 is the starting point of a loop that repeats the processing while changing the light source direction of the texture image. The separating unit 102 sets the light source direction $(\theta_i, \phi_i)$ of the texture image serving as the processing target out of the multi-viewpoint/multi-light source texture images 501. The setting of the light source direction is processed in the same manner as the setting of the viewpoint direction of step 1201.

In step 1204, the separating unit 102 acquires the pixel value at the position corresponding to the coordinates $(X_n, Y_m)$ set in step 1202 on the texture image identified by $(\theta_e, \phi_e, \theta_i, \phi_i)$.

Figure 13A:
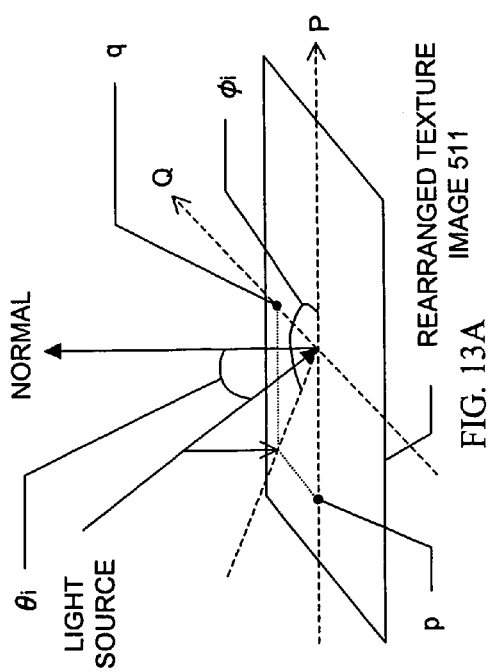
FIG. 13A shows a relation between a light source direction and coordinates of respective pixels on the rearranged texture image, FIG. 13B describes the coordinate system of the rearranged texture image.

In Step 1205, the separating unit 102 registers the pixel value acquired in step 1204 in the rearranged texture image 511 identified by $(\theta_e, \phi_e, X_n, Y_m)$. FIG. 13A shows the relation between the light source direction and the coordinates of each pixel on the rearranged texture image 511. The coordinates of each pixel on the rearranged texture image 511 correspond to the light source direction. The corresponding relation is represented in the aforementioned equations (1) and (2).

Figure 13B:
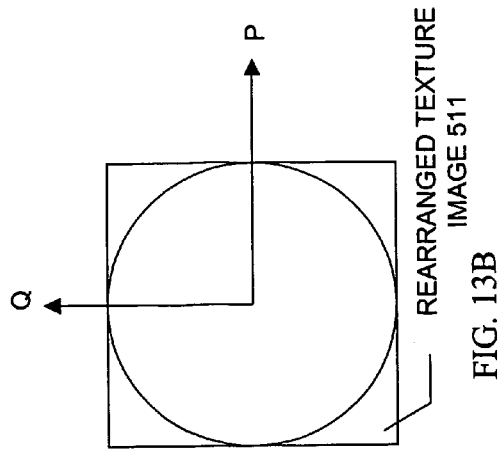
FIG. 13C shows an example of the intensity map.
FIG. 13D shows an example of the light source-independent texture image.

FIG. 13B is a diagram describing the coordinate system of the rearranged texture image 511. The separating unit 102 registers the pixel value acquired in step 1204 in (p, q), which is a point corresponding to the light source direction $(\theta_i, \phi_i)$ on the rearranged texture image 511 corresponding to the viewpoint direction $(\theta_e, \phi_e)$.

Step 1206 is the ending point of the loop that has step 1203 as the starting point. The separating unit 102 determines whether the processing from step 1204 to step 1205 is finished in regard to all light source directions.

In a case where processing in regard to all light source directions is not finished, the separating unit 102 changes the light direction and continue to process from step 1203. In a case where processing in regard to all light source directions is finished, the separating unit 102 processes the next step.

When processing from step 1204 to step 1205 is finished in regard to all light source directions, one rearranged texture image 511 is generated. This rearranged texture image 511 is identified by $(\theta_e, \phi_e, X_n, Y_m)$.

In step 1207, the separating unit 102 generates the intensity map 521 from the intensity value of each pixel of the rearranged texture image 511 identified by $(\theta_e, \phi_e, X_n, Y_m)$. The intensity map 521 is also identified by $(\theta_e, \phi_e, X_n, Y_m)$.

Figure 13C:
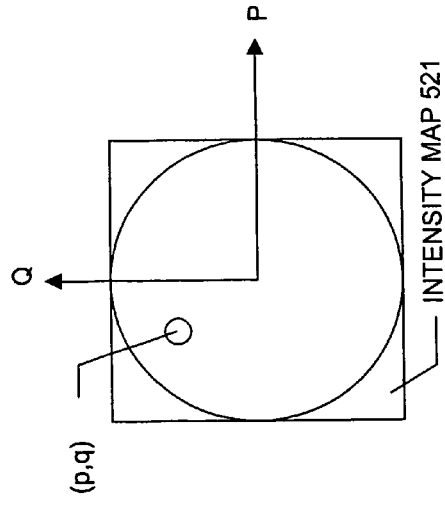

The separating unit 102 extracts the intensity value from each pixel of the rearranged texture image 511, and then generates an image having the extracted intensity value as each pixel value. This image is the intensity map 521 identified by $(\theta_e, \phi_e, X_n, Y_m)$. FIG. 13C is an example of the intensity map 521. The intensity map 521 is generated by separating the intensity value from the rearranged texture image 511 of FIG. 13B.

In step 1208, the separating unit 102 registers the color component of $(X_n, Y_m)$ in the light source-independent texture image 531 identified by $(\theta_e, \phi_e)$.

The color component registered in the light source-independent texture image 531 is determined as follows. The separating unit 102 determines the coordinates (X, Y) of the pixel whose intensity value is the greatest in the aforementioned intensity map 521 identified by $(\theta_e, \phi_e, X_n, Y_m)$. The color component of the pixel of the coordinates (X, Y) on the rearranged texture image 511 identified by $(\theta_e, \phi_e, X_n, Y_m)$ is the color component to be registered.

It should be noted that, although the pixel whose intensity value is the greatest in the intensity map 521 is determined in the present embodiment, the pixel whose intensity value is the greatest in the rearranged texture image 511 may also be determined.

Figure 13D:
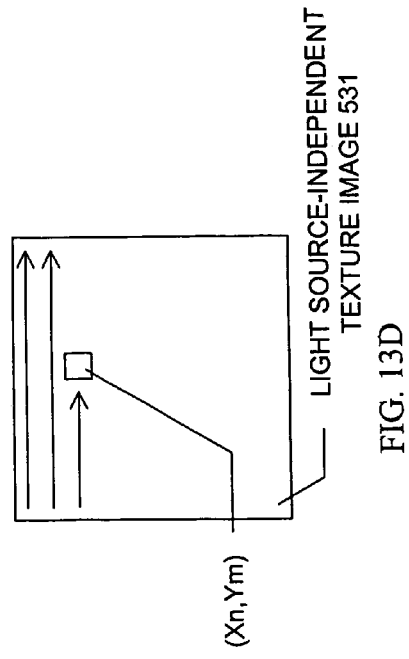

FIG. 13D shows an aspect where the color component is registered in the light source-independent texture image 531. The coordinate system of the light source-independent texture image 531 is the same as the coordinate system of the multi-viewpoint/multi-light source texture image 501.

In step 1209, the separating unit 102 determines whether the processing from step 1202 to step 1208 is finished in regard to all pixels of the texture image. In a case where the processing is not finished, the processing returns to step 1202. In a case where the processing is finished, the separating unit 102 processes the next step.

When step 1209 ends, generation of the rearranged intensity map and the light source-independent texture image in relation to a specific viewpoint direction is completed.

In step 1210, the separating unit 102 determines whether processing from step 1201 to step 1209 is finished in regard to all viewpoint directions. In a case where processing is not finished, the processing returns to step 1201.

At the stage where step 1210 ends, generation of all of the intensity maps and light source-independent texture images is completed.

Figure 14B:
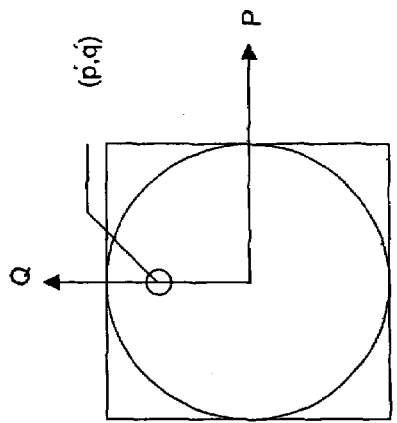
FIG. 14B shows an example of the intensity map in a case where the light source direction is defined using an appropriate reference axis.
Figure 14D:
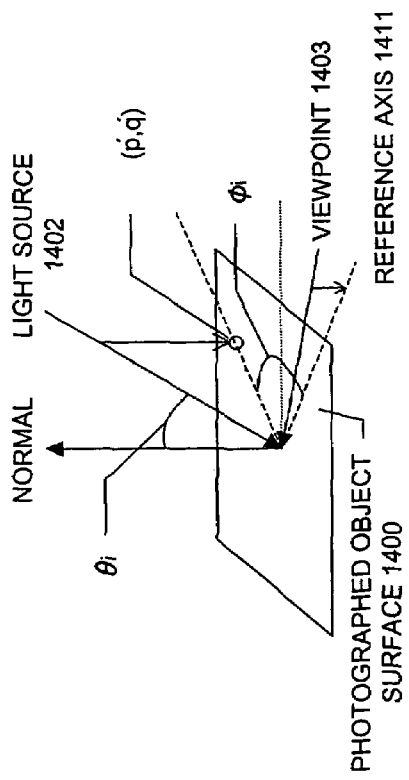
FIG. 14D shows an example of the intensity map in a case where the reference axis of the light source direction is defined on the basis of the viewpoint direction.
Figure 14A:
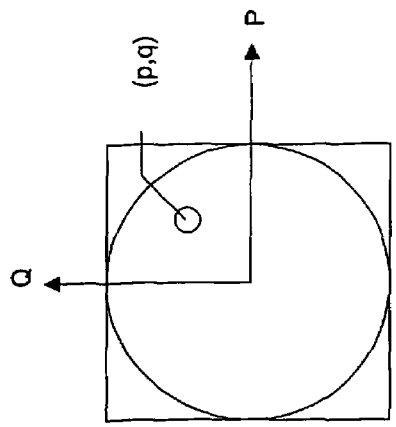
FIG. 14A shows an example of the coordinate system in a case where the light source direction is defined using an appropriate reference axis.
Figure 14C:
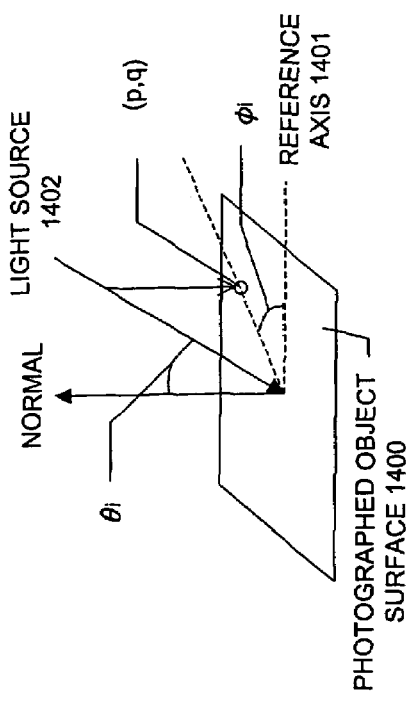
FIG. 14C shows an example of the coordinate system in a case where the reference axis of the light source direction is defined on the basis of the viewpoint direction.

It should be noted that the algorithm of the overall texture compression processing becomes simple when the reference axis, in which the coordinate system of the texture pasted on the photographed object is used as a reference like reference axis 1401 in FIG. 14A, is used as the reference axis (axis where $\phi_i=0$) of the azimuth $\phi_i$ of the light source direction. With respect thereto, compression efficiency can be increased when the axis obtained by projecting the viewpoint direction on the photographed object surface, such as reference axis 1411 of FIG. 14C, is used as the reference axis (axis where $\phi_i=0$) of the azimuth $\phi_i$ of the light source direction. That is, compression efficiency can be increased when the reference axis of the light source direction is determined on the basis of the viewpoint direction. In the present embodiment, the reference axis of the light source direction is determined on the basis of the viewpoint direction.

FIG. 14B shows a rearranged texture image in a case where the reference axis of the azimuth $\phi_i$ is fixed. FIG. 14D shows a rearranged texture image in a case where the reference axis of the azimuth $\phi_i$ has been determined on the basis of the viewpoint direction. In FIGS. 14B and 14D, the reference axes of the azimuths $\phi_i$ are different. For this reason, the coordinates of the point corresponding to the same light source direction are different.

(Details of Step 402)

Figure 15:
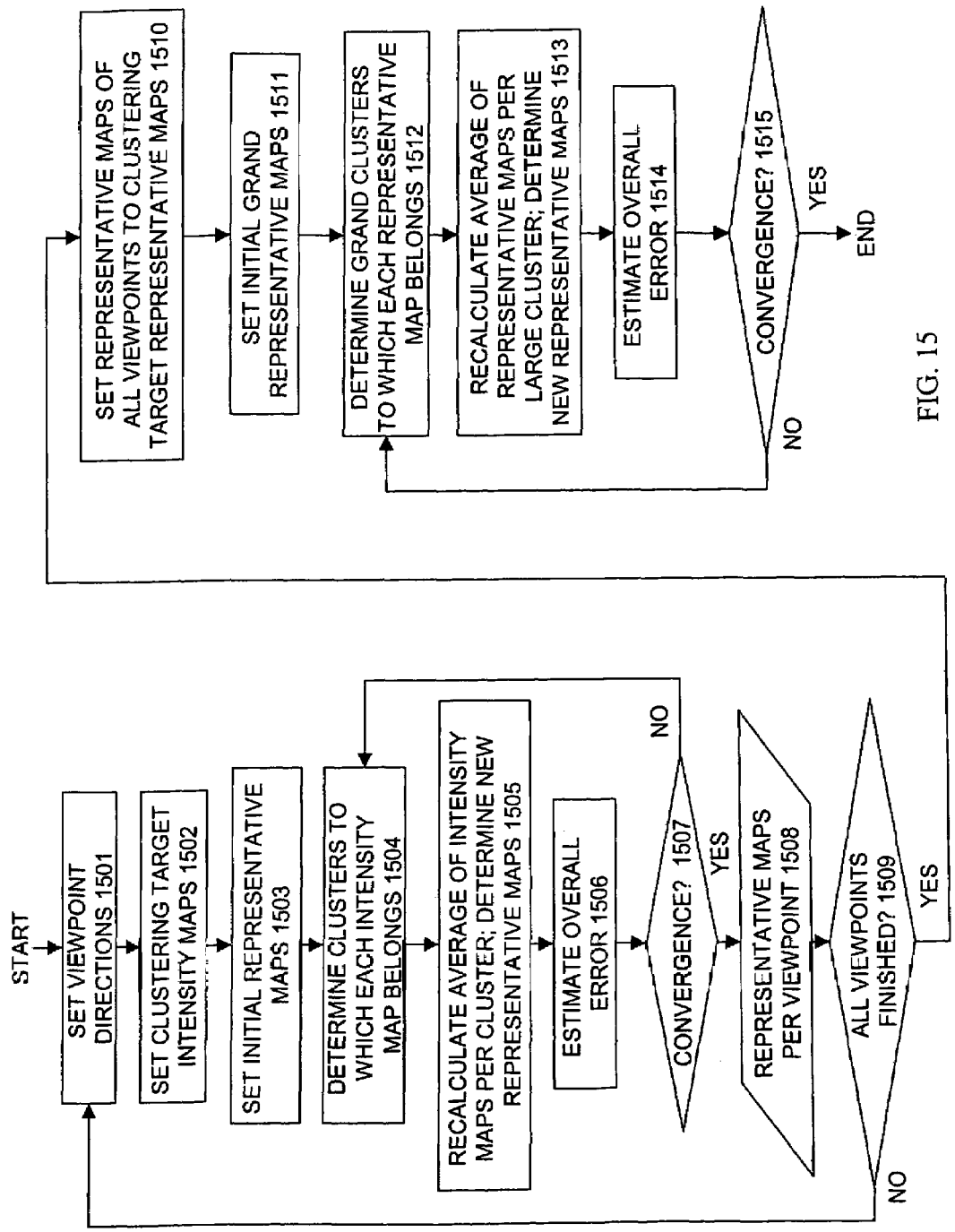
FIG. 15 shows a flow chart of quantization processing conducted with respect to the normalized intensity maps.

FIG. 15 is a flowchart of quantization processing of the intensity maps conducted in step 402 of FIG. 4. FIG. 15 is a flow chart of the quantization processing after the normalization process. That is, FIG. 15 describes processing that the intensity map compressing unit 106 (FIG. 1) conducts.

Quantization processing can be divided into two kinds of processing. One is quantization between intensity maps having the same viewpoint direction (step 1501 to step 1509). The other is quantization in regard to cases where the viewpoint directions are different (step 1510 to 1515).

Step 1501 is the starting point of repetition of quantization processing between intensity maps having the same viewpoint direction. The intensity map compressing unit 106 sets the viewpoint direction $(\theta_e, \phi_e)$ serving as the processing target.

In step 1502, the intensity map compressing unit 106 extracts clustering target intensity maps from all intensity maps. The clustering target intensity maps are all intensity maps corresponding to the viewpoint direction set in step 1501.

In step 1503, the intensity map compressing unit 106 generates a plurality of representative maps using the clustering target intensity maps. The intensity map compressing unit 106 averages all of the clustering target intensity maps to generate an average intensity map. The intensity map compressing unit 106 determines the average and standard deviation of the pixel values of the pixels at the same coordinates in all of the clustering target intensity maps. Each pixel value of the average intensity map is the average determined in regard to each coordinate.

The intensity map compressing unit 106 uses the standard deviation of each coordinate to generate a modified intensity map in which the pixel values of the average intensity map have been modified. Modified intensity maps are generated in accordance with the extent of modification. The intensity map compressing unit 106 adds, for example, ±0.5 times, ±1.0 times, ±1.5 times, etc., the standard deviation of each coordinate to each pixel value of the average intensity map to generate a modified intensity map. As described below, the average intensity map and the modified intensity maps are combined and referred to as representative maps.

In step 1504, the intensity map compressing unit 106 classifies each of the clustering target intensity maps into any of the plurality of representative maps set in step 1503. In the following description, these classes are referred to as "clusters". Also, each clustering target intensity map belongs to the cluster in which it is respectively classified.

The clusters to which the clustering target intensity maps belong are determined in the following manner. First, the intensity map compressing unit 106 determines the degree of similarity between each of the clustering target representative intensity maps and the representative maps of each cluster. Then, the intensity map compressing unit 106 places the corresponding clustering target intensity maps into clusters having the most similar representative maps. In the present embodiment, the sum of squared differences of the pixel values is used as the degree of similarity. It should be noted that the sum of absolute differences can be used in place of the sum of squared differences. Also, the vector correlation value calculated between the clustering target intensity maps and the representative maps regarding the pixel value of each pixel as a vector component can be used as the degree of similarity.

In step 1505, the intensity map compressing unit 106 averages the clustering target intensity maps belonging to each cluster to generate a new representative map. Then, the intensity map compressing unit 106 thereafter uses the new representative map as the representative map of the corresponding cluster.

In step 1506, the intensity map compressing unit 106 estimates the error between the new representative map and each clustering target intensity map per cluster. In the present embodiment, the intensity map compressing unit 106 uses the sum of squared differences as the error.

In step 1507, the intensity map compressing unit 106 determines whether the error is not more than a predetermined threshold. In a case where the error is more than the threshold, the intensity map compressing unit 106 returns to step 1504, and in a case where the error is not more than the threshold, the intensity map compressing unit 106 proceeds to the next step.

In step 1508, the intensity map compressing unit 106 stores the finally generated representative maps in, e.g., memory 302. The intensity map compressing unit 106 allocates an identifier to each representative map and also stores, in the memory, the relation between each representative map and the clustering target intensity maps belonging thereto.

In step 1509, the intensity map compressing unit 106 determines whether or not processing is finished in regard to all viewpoint directions. In a case where processing is not finished, the intensity map compressing unit 106 return to step 1501 in regard to other viewpoint directions for which processing is not finished. In a case where processing is finished, the intensity map compressing unit 106 proceeds to the next step.

In step 1510, the intensity map compressing unit 106 sets, as the clustering target representative maps, the representative maps generated by the processing up to step 1509. In the following steps, the intensity map compressing unit 106 clusters the clustering target representative maps.

In step 1511, the intensity map compressing unit 106 generates a plurality of representative maps for the clustering target representative maps like step 1503. The representative maps of the clustering target representative maps are referred to herein as "grand representative maps".

In step 1512, the intensity map compressing unit 106 determines for each of the clustering target representative maps the one of the grand representative maps to which it is not similar, in a manner similar to step 1504. Then, the intensity map compressing unit 106 classifies each clustering representative target map according to the most similar grand representative map. This classification is referred to herein as "grand clustering". As a result, each clustering target representative map belongs to the grand cluster into which each has been classified.

In step 1513, the intensity map compressing unit 106 averages the clustering target representative maps per grand cluster to generate a new representative map like, in a manner similar to step 1505. The intensity map compressing unit 106 thereafter uses the new representative map as a grand representative map of the grand clusters.

In step 1514, the intensity map compressing unit 106 estimates the error between the grand representative map and each clustering target representative map per grand cluster, in a manner similar to step 1506.

In step 1515, the intensity map compressing unit 106 determines whether the error determined in step 1514 is not more than a predetermined threshold. In a case where the error is more than the threshold, the intensity map compressing unit 106 return to step 1512.

In a case where the error is not more than the threshold, the grand representative maps are the representative intensity maps 561. The intensity map compressing unit 106 allocates an identifier (index 562) to each representative intensity map 561. The intensity map compressing unit 106 also stores, in memory, e.g., memory 302, the relation between each representative intensity map 561 and the representative maps belonging thereto.

The intensity map compressing unit 106 determines the relation between the intensity maps 521 and the representative intensity maps 561 by using the relation between the representative maps and the intensity maps 521 determined in the processing up to step 1509 and the relation between the representative maps and the representative intensity maps determined in this step. Then, the intensity map compressing unit 106 replaces each of the intensity maps 521 with the indices 562 of the representative intensity maps 561 to which each belongs. Although the intensity maps 521 are bit maps where the intensity values are grouped, the data amount representing the intensity maps 521 is reduced by the intensity maps 521 being replaced with the indices 562. That is, the intensity maps 521 are compressed.

The intensity map compressing unit 106 compiles the indices 562 representing the intensity maps 521 per viewpoint direction to generate images having the indices as pixel values. The generated images are the compressed intensity maps 571 shown in FIG. 8B.

(Details of Step 403)

The light source-independent texture image compressing unit 103 uses the method of vector quantization to compress the light source-independent texture images 531. The intensity map correction image compressing unit 105 uses the method of vector quantization to compress the intensity map correction images 551. It should be noted that the intensity map correction image compressing unit 105 of the present embodiment separately vector-quantizes the biases 552 and the scales 553 of the intensity map correction images 551. Also, the intensity map correction image compressing unit 105 of the present embodiment generates the intensity map correction compressed images 584-1 and the intensity map correction compressed images 584-2 shown in FIGS. 9B and 9C.

Figure 16:
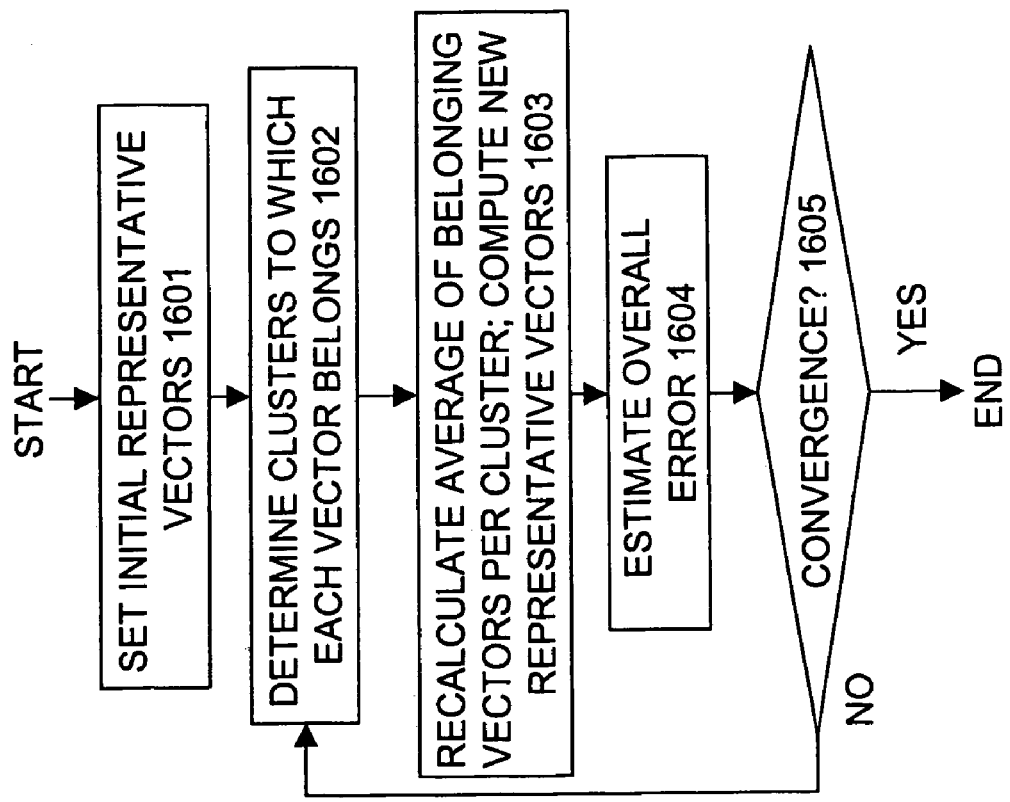
FIG. 16 shows a flow chart of vector quantization processing conducted with respect to the light source-independent texture images and the intensity map correction images.

FIG. 16 is a flow chart of processing conducted in step 403 where the light source-independent texture images 531 and the intensity map correction images 551 are vector-quantized. That is, FIG. 16 shows processing that the light source-independent texture image compressing unit 103 and the intensity map correction image compressing unit 105 conduct. Here, as an example, vector quantization of the color components 503 of the light source-independent texture images 531 by the light source-independent texture image compressing unit 103 will be described.

In step 1601, the light source-independent texture image compressing unit 103 sets an initial representative vector. The light source-independent texture image compressing unit 103 divides each light source-independent texture image 531 into regions of 4 pixels×4 pixels and then generates vectors for which the pixel values of each region are elements. One vector is generated for each region. Also, if the light source-independent texture images 531 are RGB color images, each generated vector is a vector of 48 dimensions=4 pixels×4 pixels×3 colors (R, G and B).

The light source-independent texture image compressing unit 103 uses these vectors to generate a plurality of representative vectors. The representative vectors generated in the present embodiment include vectors which are each the average of all the vectors and vectors which have been given a predetermined deviance (deviance based on the standard deviation) therefrom.

In step 1602, the light source-independent texture image compressing unit 103 obtains the cluster to which each vector belongs. The light source-independent texture image compressing unit 103 searches for the most similar representative vectors in regard to each vector. The light source-independent texture image compressing unit 103 calculates the Euclidean distance between each vector and representative vector. The representative vector having the closest Euclidean distance is the most similar to each vector.

Then, the light source-independent texture image compressing unit 103 classifies each vector into the most similar representative vector. This classification is referred to herein as "clustering". As a result, each vector belongs to the cluster into which each has been classified.

In step 1603, the light source-independent texture image compressing unit 103 generates an average vector of the vectors belonging to each cluster and then uses the generated average vector as a new representative vector of that cluster.

In step 1604, the light source-independent texture image compressing unit 103 estimates, per cluster, the error between the new representative vectors and each vector belonging to that cluster.

In step 1605, the light source-independent texture image compressing unit 103 determines whether the error calculated in step 1604 is not more than a predetermined threshold. In a case where the error is more than the threshold, the light source-independent texture image compressing unit 103 returns to step 1602 and continues processing by using the new representative vectors generated in step 1603 as the representative vectors.

In a case where the error is not more than the threshold, the light source-independent texture image compressing unit 103 assigns an identifier (index) to each cluster and generates an index conversion table representing the relation between the indices and the representative vectors of each cluster. Then, the light source-independent texture image compressing unit 103 substitutes the indices for the clusters. In this manner, the light source-independent texture images 531 are compressed by replacing the clusters with the indices.

As described above, by using the texture compressing device of the present embodiment, large amounts of texture image data can be efficiently compressed.

Also, because the intensity maps are compressed by using the representative intensity maps, not all of the compressed texture is needed to decompress the texture image corresponding to a desired viewpoint direction and a desired light source direction. Thus, when the viewpoint direction or the light source direction has changed, the data amount of the portion newly needed in the compressed texture is small. That is, the texture compressing device has excellent random access capabilities corresponding to the texture images.

Next, data amounts before and after compression of the large amount of multi-viewpoint/multi-light source texture images are compared by way of specific examples. For example, data amounts are compared before and after compression in a case where the following multi-viewpoint/multi-light source texture images are compressed.

(A) Each multi-viewpoint/multi-light source texture image is an image of 256 pixels×256 pixels.

(B) Each pixel is represented by 3 bytes: one byte each for red, green and blue.

(C) As for the light source directions, there are a total of 288 samples resulting from 36 $\theta$-direction samples and 8 $\phi$-direction samples.

(D) As for the viewpoint directions, there are a total of 288 samples resulting from 36 $\theta$-direction samples and 8 $\phi$-direction samples.

The total data amount of the multi-viewpoint/multi-light source texture images can be estimated at (256×256)×3×(36×8)×(36×8)=16.3 Gbytes.

The multi-viewpoint/multi-light source texture images are compressed by using the texture compressing device of the present embodiment. First, the post-compression data amount of the components independent of the light source (the light source-independent texture images and the intensity map correction images) is estimated. In this estimation, it is assumed that the components independent of the light source are compressed under the following conditions.

(E) 16-bit quantization is used.

(F) The block size of vector quantization is 4 pixels×4 pixels.

Due to the light source-independent components being compressed, the light source-independent texture compressed images 581 and the intensity map correction compressed images 584-1 and 584-2 are obtained. The data amount of the conversion tables (color components, scales, biases) of these three kinds of compressed images is estimated at 65536×4×4×(3+2)=5.2 Mbytes. Additionally, the data amount of the compressed images expressed by the indices is estimated at ((256/4)×(256/4))×(36×8)×2×3=7.2 Mbytes.

Next, the post-compression data amount of the light source-independent components is estimated, i.e., the intensity maps. In this estimation, it is assumed that the intensity maps are compressed under the following conditions.

(G) The intensity maps are images of 64 pixels×64 pixels.

(H) The intensity values are represented by 1 byte in post-compression data.

(I) 256 (maximum number expressible by 1 byte) representative intensity maps are generated.

It should be noted that condition (G) is based on a common occurrence that the number of pixels of the intensity maps may be less than the images because, in most images, changes of intensity are milder than changes of the color components.

Due to the intensity maps being compressed, quantized intensity maps and representative intensity maps corresponding to codebooks thereof are obtained. The data amount of the representative intensity maps is estimated at (64×64)×1×256=1 Mbyte. Also, the data amount of the quantized intensity maps is estimated at (256×256)×1×(36×8)=19 Mbytes.

Thus, the data amount of the compressed texture is estimated at 5.2 Mbytes+7.2 Mbytes+1 Mbyte+19 Mbytes=32.4 Mbytes. The multi-viewpoint/multi-light source texture images that were 16.3 Gbytes before compression are compressed to about 33 Mbytes.

A second embodiment will be described below with reference to the drawings.

The second embodiment relates to a texture decompressing device that decompresses texture images of desired viewpoint directions and desired light source directions from the compressed texture generated by the texture compressing device of the first embodiment. The texture decompressing device of the second embodiment decompresses texture images of desired viewpoint directions and desired light source directions from compressed texture 1100 (including the representative intensity maps 1101, the conversion tables 1102 and 1103, and the compressed texture blocks 1104-1 to 1104-N) having the data structure shown in FIG. 11.

It should be noted that, similar to the texture compressing device of the first embodiment, the texture decompressing device of the second embodiment is also realized as a program operated on a computer. However, part or all of the configuration of the device can also be realized by hardware such as a semiconductor integrated circuit.

Figure 17:
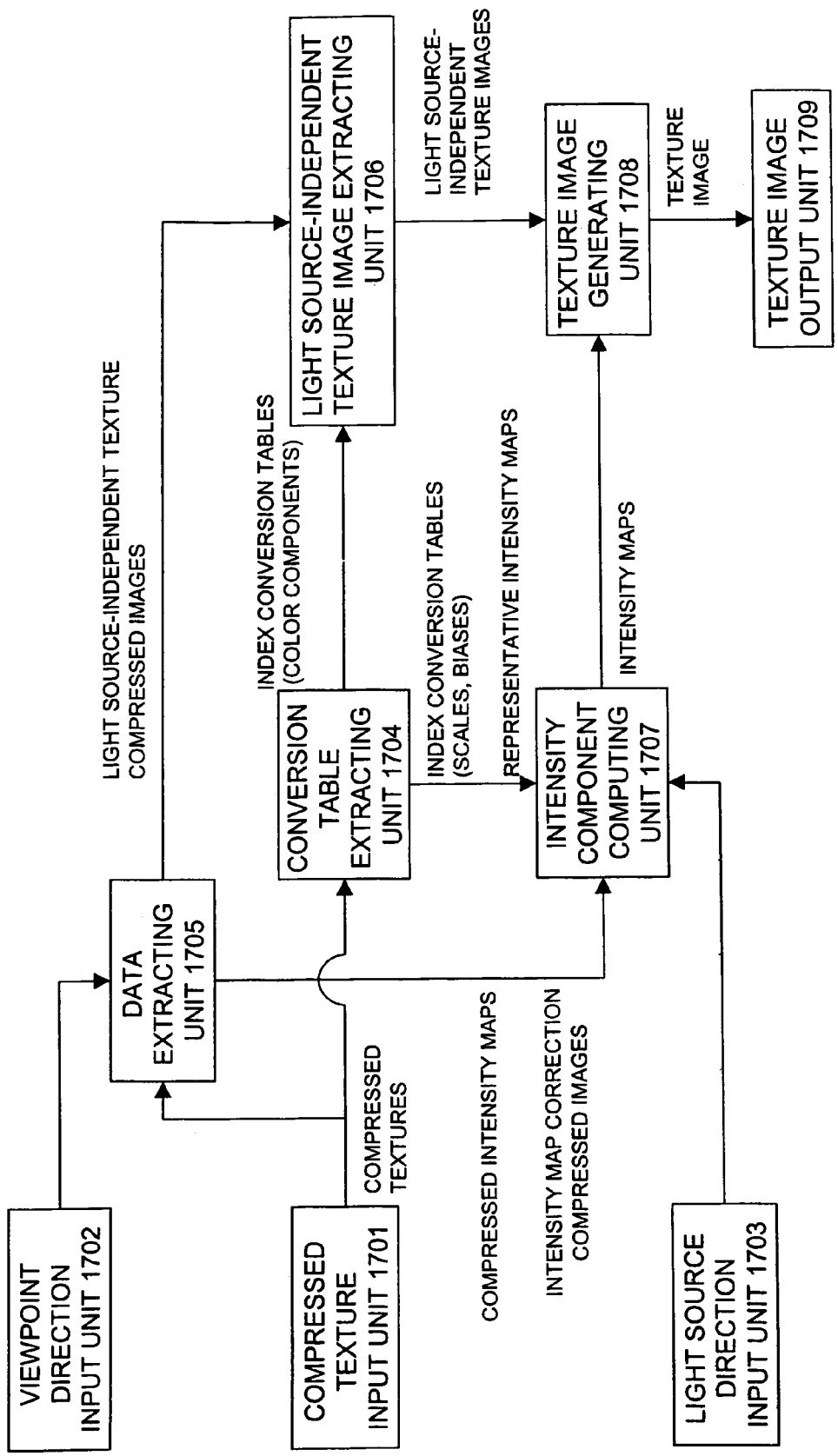
FIG. 17 shows a block diagram of a texture decompressing device of a second embodiment.

FIG. 17 is a block diagram of a texture decompressing device 1700 of the second embodiment. A compressed texture input unit 1701 inputs compressed texture. A viewpoint direction input unit 1702 inputs viewpoint directions of texture images to be decompressed. A light source direction input unit 1703 inputs light source directions of texture images to be decompressed. A conversion table extracting unit 1704 extracts representative intensity maps and conversion tables of the color components, scales and biases from the inputted compressed texture. The conversion table extracting unit 1704 outputs the representative intensity maps to an intensity component computing unit 1707. The conversion table extracting unit 1704 outputs the conversion tables of the color components, scales and biases to a light source-independent texture image generating unit 1706.

A data extracting unit 1705 extracts compressed texture blocks corresponding to the inputted viewpoint directions from the inputted compressed texture and extracts compressed intensity maps and light source-independent texture compressed images from the extracted compressed texture blocks. The data extracting unit 1705 outputs the compressed intensity maps to the intensity component computing unit 1707. The data extracting unit 1705 outputs the light source-independent texture compressed images to the light source-independent texture image generating unit 1706.

The light source-independent texture image extracting unit 1706 extracts the light source-independent texture images and the intensity map correction images from the light source-independent texture compressed images by using the conversion tables of the color components, scales and biases. The intensity component computing unit 1707 computes the intensity components of the intensity map in specific viewpoint directions and specific light source directions from the compressed intensity maps by using the representative intensity maps, the intensity map correction images and the inputted light source directions.

A texture image generating unit 1708 generates texture images by using the extracted light source independent texture images and the computed intensity map. A texture image output unit 1709 outputs the generated texture images.

Figure 18:
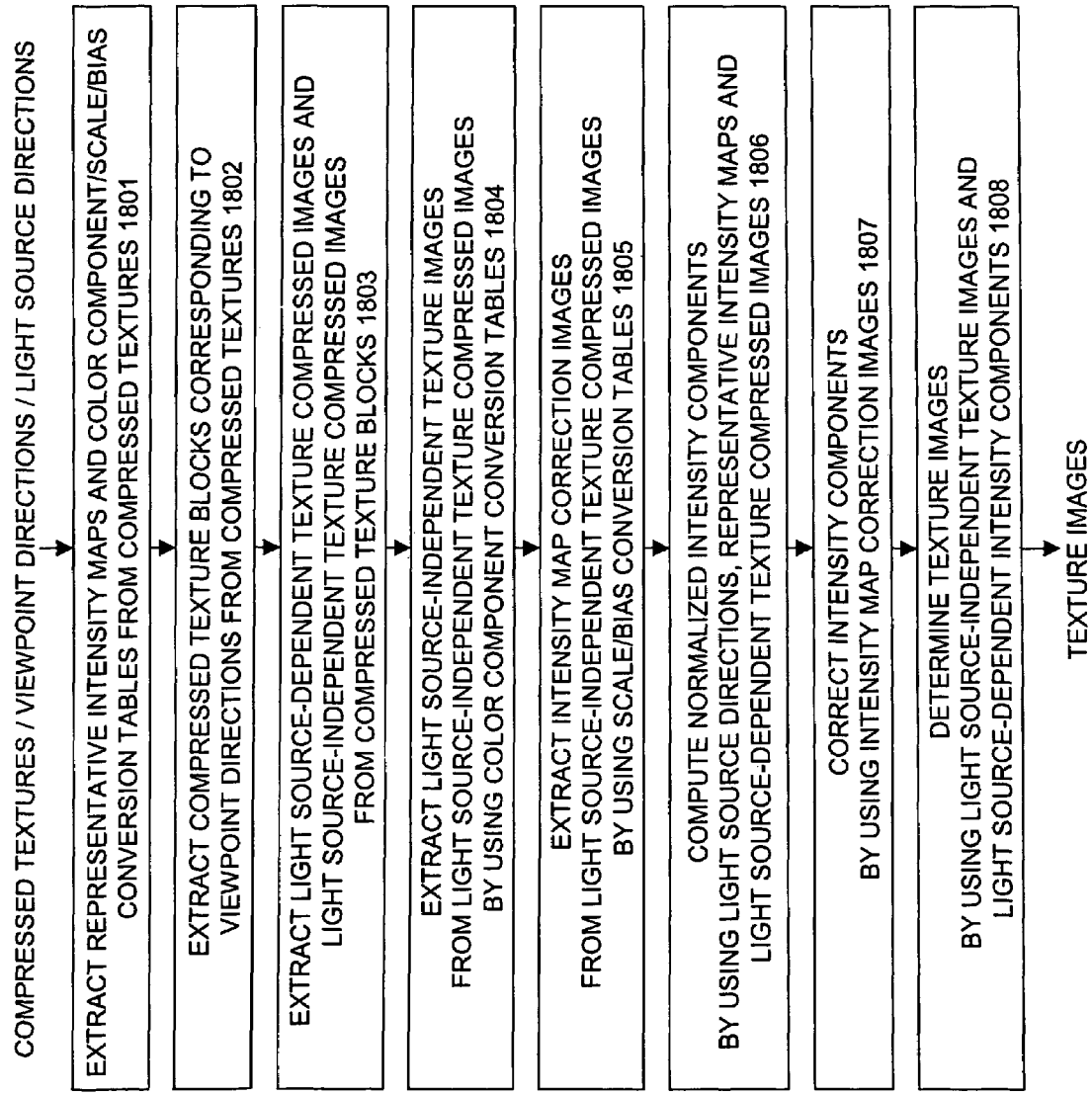
FIG. 18 shows a flow chart of decompression processing of texture images conducted by the texture decompressing device of the second embodiment.

FIG. 18 is a flow chart of decompression processing by the texture decompressing device 1700 of the second embodiment.

In step 1801, the conversion table extracting unit 1704 extracts the representative intensity maps 561, the index conversion tables 583 of the color components, the index conversion tables 587 of the scales and the index conversion tables 588 of the biases from the inputted compressed textures 1100. Then, the conversion table extracting unit 1704 outputs the index conversion tables 583 of the color components to the light source-independent texture image extracting unit 1706. Also, the conversion table extracting unit 1704 outputs the representative intensity maps 561, the index conversion tables 587 of the scales and the index conversion tables 588 of the biases to the intensity component computing unit 1707.

In step 1802, the data extracting unit 1705 extracts the intensity texture blocks 591 corresponding to the inputted viewpoint direction from the inputted compressed texture 1100.

Figure 19:
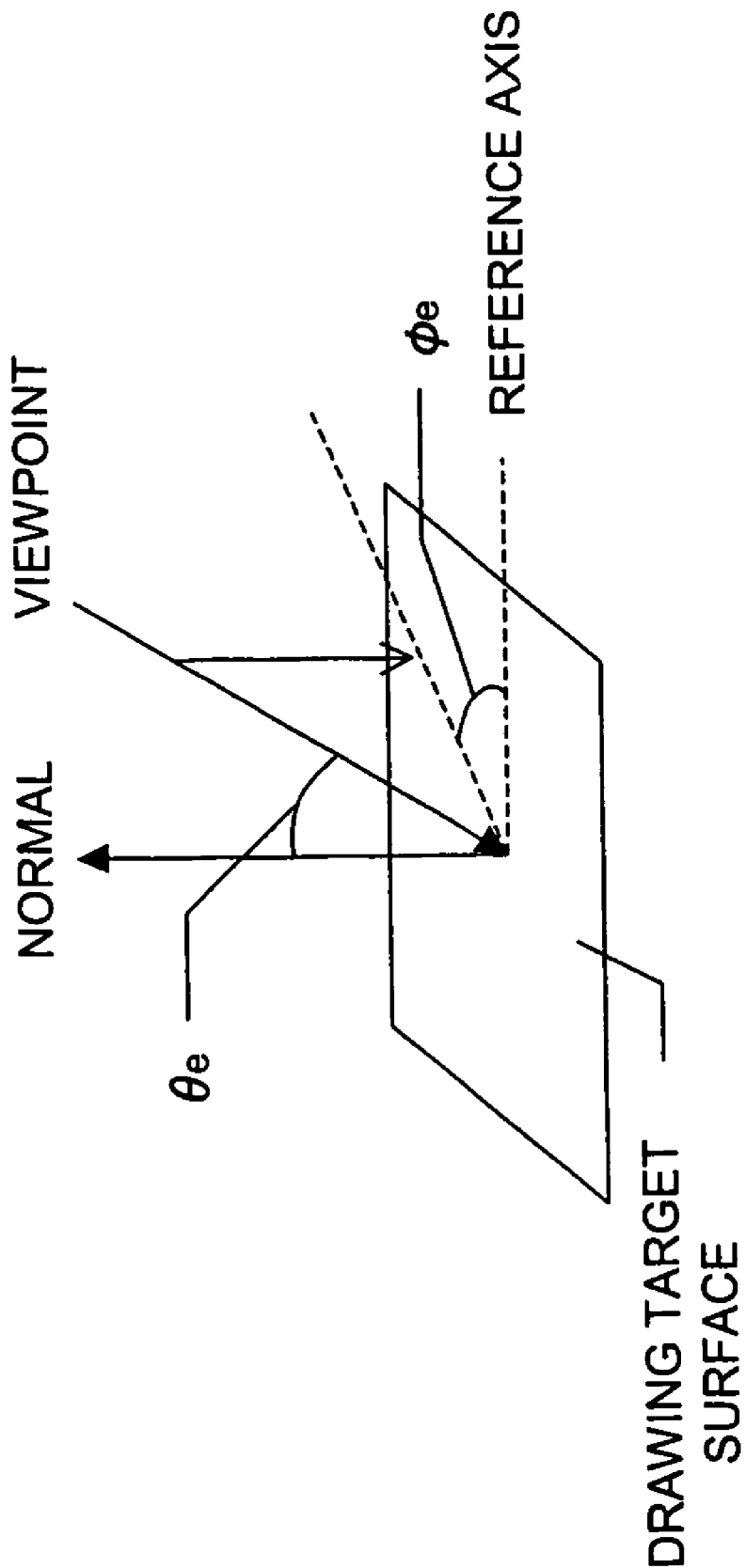
FIG. 19 shows a coordinate system for expressing the viewpoint direction used at the time of decompression processing.

FIG. 19 shows a spherical coordinate system used at the time of drawing the texture image. The viewpoint direction is represented by the azimuth and polar angle $(\theta_e, \phi_e)$ in this coordinate system. The data extracting unit 1705 acquires the compressed texture blocks by using the viewpoint direction represented in this manner. Similar to the first embodiment, the reference axis (axis where $\phi_e=0$) of the light source direction is defined using $\phi_e$. That is, the reference axis of the light source direction changes in accordance with the viewpoint direction.

The compressed texture blocks acquired by the data extracting unit 1705 are generated per viewpoint direction as shown in FIG. 11. The data extracting unit 1705 extracts the compressed texture blocks per viewpoint direction.

In step 1803, the data extracting unit 1705 extracts the compressed intensity maps 571, the light source-independent texture compressed images 581 and the intensity map correction compressed images 584-1 and 584-2 from the compressed texture blocks 591. The data extracting unit 1705 outputs the compressed intensity maps 571 and the intensity map correction compressed images 584-1 and 584-2 to the intensity component computing unit 1707. Also, the data extracting unit 1705 outputs the light source-independent texture compressed images 581 to the light source-independent texture image extracting unit 1706.

In step 1804, the light source-independent texture image extracting unit 1706 uses the index conversion tables 583 of the color components to generate the light source-independent texture images 531 from the light source-independent texture compressed images 581. Then, the light source-independent texture image extracting unit 1706 outputs the light source-independent texture images 531 to the texture image generating unit 1708.

The light source-independent texture compressed images 581 are vector-quantized. Each pixel value of the light source-independent texture compressed images 581 is an index. The light source-independent texture image extracting unit 1706 references the conversion tables 583 of the color components to substitute the index of each pixel of the light source-independent texture compressed images 581 with the pixel values of the color components.

In step 1805, the intensity component computing unit 1707 uses the conversion tables 587 of the scales and the conversion tables 588 of the biases to generate the intensity map correction images 551 from the intensity map correction compressed images 584-1 and 584-2.

The intensity map correction compressed images 584-1 and 584-2 are vector-quantized. The intensity component computing unit 1707 uses the conversion tables 587 of the scales and the conversion tables 588 of the biases to substitute each pixel value of the intensity map correction compressed images 584-1 and 584-2 with the biases 552 and 553. Due to this processing, the intensity component computing unit 1707 extracts the intensity map correction images 551.

As described in the first embodiment, the intensity value 563 of each pixel of the representative intensity maps 561 is a normalized intensity value. The parameters for correcting this to the original value are the biases 552 and the scales 553. The intensity map correction images 551 have the biases 552 and the scales 553 as pixel values.

In step 1806, the intensity component computing unit 1707 uses the inputted light source directions, the extracted representative intensity maps 561 and the compressed intensity maps 571 to determine the normalized intensity value of each point on the texture images.

The intensity component computing unit 1707 acquires each pixel value of the compressed intensity maps 571. As described in the first embodiment, the pixel values of the compressed intensity maps 571 are indices identifying each of the representative intensity maps 561. The intensity component computing unit 1707 references the representative intensity maps 561 identified by this pixel value. The intensity component computing unit 1707 acquires, as the normalized intensity values, the pixel values of points corresponding to the inputted light source directions on the representative intensity maps 561.

FIGS. 7B and 8B show that the compressed intensity maps 571 have the same coordinate system as the texture images and that each point on the compressed intensity maps 571 corresponds to each point of the texture images. Thus, when the intensity component computing unit 1707 completes this step in regard to all points on the compressed intensity maps 571, the normalized intensity value of each point on the texture images is determined. That is, the normalized intensity values of the overall texture images in a certain viewpoint direction and a certain light source direction are obtained.

It should be noted that the corresponding relation between each point on the representative intensity maps and the light source directions is represented by the aforementioned equations (1) and (2).

In step 1807, the intensity component computing unit 1707 uses the intensity map correction images 584-1 and 584-2 to compute the original intensity values from the normalized intensity values.

In a case where the intensity value of each pixel is normalized to 1 byte (256 levels from 0 to 255) by using the aforementioned equation (3), the original intensity values are computed by the following equation.

$$I_{orig} = (I_{norm} \times \text{Scale}/255) + \text{Bias} \quad (4)$$

In equation (4), the intensity value after correction is represented by $I_{orig}$, the intensity value of a certain pixel before correction is represented by $I_{norm}$, the scale is represented by "Scale" and the bias is represented by "Bias".

In step 1808, the texture image generating unit 1708 uses the light source-independent texture images 531 and the intensity values calculated in step 1807 to generate texture images.

The texture image generating unit 1708 multiplies the pixel value of each point of the light source-independent texture images with the intensity value of the point corresponding to that point to generate texture images having ordinary pixel values.

As described above, the texture decompressing device of the second embodiment can decompress texture images corresponding to desired viewpoint directions and desired light source directions from compressed textures.

Other embodiments of the present invention will be apparent to those skilled in the art from consideration of the specification and practice of the invention disclosed herein. It is intended that the specification and example embodiments be considered as exemplary only, with a true scope and spirit of the invention being included by the claims that follow.

What is claimed is:

1. A texture image compressing system, comprising:
   a data processing unit;
   a memory unit; and
   a texture image compressing module which is stored in the memory unit, and which is processed by the data processing unit;
   wherein the texture image compressing module includes:
   a separating unit configured to rearrange a plurality of texture images corresponding to a plurality of different light source directions and a plurality of different viewpoint directions into a plurality of rearranged texture images by grouping pixels included in the plurality of texture images per viewpoint direction and coordinate on each of the texture images, and separate intensity maps including intensity values and light source-independent texture images including color components from the plurality of rearranged texture images;
   an intensity map compressing unit configured to compress the intensity maps to generate compressed intensity maps and representative intensity maps that are codebooks of the compressed intensity maps;
   a light source-independent texture image compressing unit configured to compress the light source-independent texture images to generate light source-independent texture compressed images and color component conversion tables that are codebooks of the light source-independent texture compressed images; and
   a compressed texture generating unit configured to generate compressed textures by combining the compressed intensity maps, the representative intensity maps, the light source-independent texture compressed images and the color component conversion tables.

2. The texture image compressing system according to claim 1, wherein the memory unit includes:
   a main memory device; and
   an auxiliary storage device.

3. A texture image decompressing system, comprising:
   a data processing unit;
   a memory unit; and
   a texture image decompressing module which is stored in the memory unit, and which is processed by the data processing unit;
   wherein the texture image decompressing module includes:
   a compressed texture input device inputting a compressed texture into which a plurality of texture images corresponding to a respective plurality of different light source directions and a plurality of different viewpoint directions have been compressed;
   a light source/viewpoint direction input device inputting a viewpoint direction and a light source direction of a decompression target texture image;
   a conversion table extracting unit configured to extract, from the compressed texture, representative intensity maps and color component conversion tables;
   a data extracting unit configured to extract, from the compressed texture, compressed intensity maps corresponding to the inputted viewpoint direction and light source-independent texture compressed images corresponding to the inputted viewpoint direction;
   a light source-independent texture image extracting unit configured to extract light source-independent texture images from the light source-independent texture compressed images by using the color component conversion tables;
   an intensity component computing unit configured to compute intensity components of the decompression target texture image by using the representative intensity maps and the compressed intensity maps; and
   a texture image generating unit configured to generate the decompression target texture image by using the light source-independent texture images and the intensity components.

4. The texture image decompressing system according to claim 3, wherein the memory unit includes:
   a main memory device; and
   an auxiliary storage device.

* * * * *